United States Patent [19]

Yamashita

[11] Patent Number: 5,715,295
[45] Date of Patent: Feb. 3, 1998

[54] RADIO CHANNEL SELECTING METHOD SUITABLE FOR A MOBILE STATION TO MOBILE STATION DIRECT COMMUNICATION SYSTEM, AND THE ORIGINATING MOBILE STATION AND DESTINATION MOBILE STATION USED IN THE SYSTEM

[75] Inventor: Hiroyuki Yamashita, Kawasaki, Japan

[73] Assignee: Fujitsu Limited, Kanagawa, Japan

[21] Appl. No.: 290,360

[22] Filed: Aug. 15, 1994

[30] Foreign Application Priority Data

Mar. 10, 1994 [JP] Japan ................... 6-040002

[51] Int. Cl.[6] ............................................. H04Q 7/20
[52] U.S. Cl. ..................... 379/58; 379/63; 455/34.1
[58] Field of Search ........................ 379/58, 59, 61, 379/62, 63; 455/33.1, 34.1, 34.2, 54.1, 51.1, 56.1

[56] References Cited

U.S. PATENT DOCUMENTS

| | | |
|---|---|---|
| 4,672,657 | 6/1987 | Dershowitz ............... 455/34.1 X |
| 4,977,608 | 12/1990 | Hashimoto et al. ............. 455/34.2 X |
| 5,140,628 | 8/1992 | Murata et al. ............. 379/61 |
| 5,247,567 | 9/1993 | Hirano ............. 379/61 |
| 5,371,780 | 12/1994 | Amitay ............. 379/58 |

FOREIGN PATENT DOCUMENTS 5284102 10/1993 Japan.

Primary Examiner—William Cumming
Assistant Examiner—William G. Trost
Attorney, Agent, or Firm—Helfgott & Karas P.C.

[57] ABSTRACT

In a wireless or cordless communication system, a method for direct communication among mobile stations without going through a base station. Carrier selecting means in the destination mobile station select a carrier, based on information regarding the call number of the destination mobile station. The carrier is selected among j (natural number) carriers at intervals of i (natural number) based on an initial value n (natural number) plus the remainder obtained by dividing a call number of the destination mobile unit by L (natural number).

64 Claims, 15 Drawing Sheets

(a) SCAN CHANNEL WITH CHANNEL No.5
(b) SCAN CHANNEL WITH CHANNEL No.6
(c) SCAN CHANNEL WITH CHANNEL No.7

(a) SCAN CHANNEL WITH CHANNEL No.5
(b) SCAN CHANNEL WITH CHANNEL No.6
(c) SCAN CHANNEL WITH CHANNEL No.7

FIG.9(a) FIG.9(b) FIG.9(c) FIG.9(d)

| | FIG.9(a) | FIG.9(b) | FIG.9(c) | FIG.9(d) |
|---|---|---|---|---|
| F₀ | ROTATION No.Y | 3 | 4 | 6 |
| F₁ | CHANNEL No. | "5" | "5" | "5" |
| F₂ | CHANNEL No. | "6" | "6" | "6" |
| ⋮ | ⋮ | "7" | "5" | "5" |
| | | | "7" | "7" |
| Fy | CHANNEL No. | | | "5" |
| | | | | "6" |
| | SPARE | SPARE | SPARE | SPARE |

1

RADIO CHANNEL SELECTING METHOD SUITABLE FOR A MOBILE STATION TO MOBILE STATION DIRECT COMMUNICATION SYSTEM, AND THE ORIGINATING MOBILE STATION AND DESTINATION MOBILE STATION USED IN THE SYSTEM

BACKGROUND OF THE INVENTION

1) Field of the Invention

The present invention relates to a radio channel selecting method suitable for a mobile station to mobile station direct communications system, and relates to an originating mobile station and a destination mobile station, each used in the same system.

2) Description of the Related Art

In recent years, the personal handy phone system is proceeding toward practical use as a cordless telephone system which can be used outdoors.

The personal handy phone system, as shown in FIG. 14, is a simple portable telephone system being a cordless telephone with an enlarged use range. This system is characterized in that a radio base station (BS) 5 corresponding to the transponder of a cordless telephone (mobile station) 4 is installed as an outdoor radio portable terminal, so that the cordless telephone 4 can be used outdoors as a cellular telephone. This means that a mobile station 4 of a cordless telephone set for homes or offices can be used outdoors or at places away indoors.

The digital cordless telephone set 4 is used in the personal handy phone system. This approach allows a direct communication between terminal mobile stations 4, without relaying via the base station (BS) 5.

In order to perform a mobile station to mobile station communication via no base station 5 in the personal handy phone system, the destination mobile station 4 detects a carrier (channel) allocated for the mobile station to mobile station direct communications, thus detecting the channel selected by the originating mobile station.

An example of controlling originating and incoming calls between the mobile station will be explained with reference to FIG. 15. In this case, carrier numbers 1, 2, . . . , and N are allocated for mobile station to mobile station direct communications.

Normally, the destination mobile station 4b scans sequentially the carriers of the carrier numbers 1, 2, . . . , and N to wait for an incoming call to itself (refer to FIG. 15(1)).

In communications, the originating mobile station 4a retrieves a vacant channel among the carriers of the carrier numbers 1, 2, . . . , and N. After the handset 4a finds a vacant channel, it calls the opposite party (destination wireless handset 4b) (refer to (2) in FIG. 15).

When detecting an incoming call to itself (refer to (3) in FIG. 15), the destination mobile station 4b sounds a ringing tone. Then, telephone communications start by performing a response operation by an operator at the destination side.

Next, an example of controlling a channel switching during communications will be explained with reference to FIG. 6.

When the destination mobile station 4b detects, for example, radio wave interference during a direct communication between mobile station, it requests the originating mobile station 4a to perform a channel switching operation.

In response to the channel switching request signal, the originating mobile station 4a starts a retrieving operation

2 from the a channel to be switched among the carriers of the carrier numbers 1, 2, . . . , and N (refer to (1) in FIG. 16).

Next, the destination mobile station 4b scans the channel to be switched which is selected by the originating mobile station 4a from the carriers of the carrier numbers 1, 2, . . . , and N (refer to (2) in FIG. 16) to detect the channel to be switched (refer to (3) in FIG. 16). Thereafter, a telephone communication is performed using the switched channel.

However, the conventional radio channel selecting method has a disadvantage in that if N is larger (or the number of carriers is large), the mobile station must scan a large number of carriers to detect an incoming call or a switched channel, thus relatively prolonging the detection time and wasting electric power.

Moreover, reducing the number N of carriers in the system for the purpose of a short detection time results in a decrease of the number of simultaneous communicable channels. Hence, there is a problem in that the convenience may be impaired.

SUMMARY OF THE INVENTION

The present invention is made to overcome the above mentioned problems. An object of the present invention is to provide a radio channel selecting method suitable in a mobile station to mobile station direct communications system wherein the time during which a channel to be switched is detected during an incoming call detection or communication is reduced for effective channel uses.

Another object of the present invention is to provide an originating mobile station used in a mobile station to mobile station direct communication system.

Still another object of the present invention is to provide a destination mobile station used in a mobile station to mobile station direct communications system.

In order to achieve the above objects, according to the present invention, the radio channel selecting method suitable for a mobile station to mobile station direct communications system is characterized by performing a direct communication between mobile stations used for a cordless telephone system, without sending via a transponder, in such a manner that an originating mobile station selects a carrier based on information regarding a destination mobile station when the originating mobile station selects the carrier which is used as a radio channel to be switched during a call or communication.

The originating mobile station selects the carrier based on information regarding a call number of the destination mobile station, the carrier being used as a radio channel during a call or communication to be switched.

The originating mobile station selects a carrier which is used as a radio channel during a call or communication to be switched, the carrier being one selected from an initial value at intervals of i (natural number) and among j (natural number) radio carriers, the initial value being n (natural number) plus a remainder obtained by dividing the call number of the destination mobile station by L (natural number).

Furthermore, the originating mobile station selects a selectable carrier with a priority, the carrier being used as a radio channel during a call or communication to be switched.

According to the present invention, the radio channel selecting method suitable for a mobile station to mobile station direct communications system is characterized by performing a direct communication between mobile station used for a cordless telephone system, without sending via a transponder, in such a manner that an originating mobile station selects a carrier based on information regarding a destination mobile station, the carrier being used as a radio channel during a call or communication to be switched; and that the destination mobile station selects a carrier based on information regarding the destination mobile station itself when a radio channel to be switched is retrieved during an incoming call or communication.

The originating mobile station selects a carrier based on information regarding the call number of the destination mobile station, the carrier being used as a channel to be switched during a call or communication, and the destination mobile station selects a carrier based on information regarding the call number of the destination mobile station itself when a radio channel to be switched is retrieved during an incoming call or communication.

The originating mobile station selects a carrier which is used as a radio channel during a call or communication to be switched, the carrier being one selected from an initial value at intervals of i (natural number) and among j (natural number) radio carriers, the initial value being n (natural number) plus a remainder obtained by dividing the call number of the destination mobile station by L (natural number), and the destination mobile station selects a carrier which is used as a radio channel during an incoming call or communication to be switched, the carrier being one selected from an initial value at intervals of i (natural number) and among j (natural number) radio carriers, the initial value being n (natural number) plus a remainder obtained by dividing the call number of the destination mobile station by L (natural number).

The destination mobile station selects a selectable carrier with a priority, based on a carrier used in the past by itself, when a radio channel to be switched is retrieved during an incoming call or communication.

The destination mobile station selects a selectable carrier with a priority when a radio channel to be switched is retrieved during an incoming call or communication.

The destination mobile station adjusts the retrieval frequency to a selectable carrier based on a carrier used in the past when a radio channel to be switched is retrieved during an incoming call or communication.

According to the present invention, the originating mobile station suitable in a mobile station to mobile station direct communications system, the originating mobile station being used in a cordless telephone system and performing a direct communications between mobile station without relaying via a transponder, is characterized by carrier selecting means for selecting a carrier used as a radio channel to be switched during a call or communication, based on information regarding a destination mobile station.

The carrier selecting means selects the carrier based on information regarding a call number of the destination mobile station.

The carrier selecting means comprises initial value setting means for setting as an initial value a value of n (natural number) plus a remainder obtained by dividing the call number of the destination mobile station by L (natural number), and carrier selecting means for selecting a carrier to be used among j (natural number) radio carriers and selected at intervals of i (natural number), based on the initial value set by means of the initial value setting means.

The carrier selecting means selects a selectable carrier with a priority.

The originating mobile station may include carrier selection changing means that changes a carrier selection condition for the carrier selecting means.

The carrier selection changing means changes a carrier selection condition in accordance with information inputted via operating means added to the originating mobile station.

According to the present invention, the destination mobile station suitable in a wireless handset to mobile station direct communications system, the originating mobile station being used in a cordless telephone system and performing a direct communications between mobile station without relaying via a transponder, is characterized by carrier selecting means for selecting a carrier used as a radio channel to be switched during an incoming call or communication, based on information regarding the destination mobile station itself.

The carrier selecting means selects a carrier based on information regarding a self call number.

The carrier selecting means includes initial value setting means for setting as an initial value a value of n (natural number) plus a remainder obtained by dividing the call number of the destination mobile station by L (natural number); and carrier selecting means for selecting a carrier to be used among j (natural number) radio carriers and selected at intervals of i (natural number), based on the initial value set by means of the initial value setting means.

The carrier selecting means selects a selectable carrier with a priority.

The carrier selecting means includes memory means for storing information regarding a carrier used in the past, and selecting means for selecting a selectable carrier with a priority based on the carrier information used in the past stored in the memory means.

The carrier selecting means includes memory means for storing information regarding a carrier used in the past, and means for adjusting a selectable carrier with a retrieval frequency based on the carrier information used in the past stored in the memory means.

The destination mobile station may further include carrier selection changing means that changes a carrier selection condition for the carrier selecting means.

Furthermore, the carrier selection changing means changes a carrier selection condition in accordance with information inputted via an operating means added to the originating mobile station.

As described above, according to the radio channel selecting method used in a mobile station to mobile station direct communications system of the present invention, since the originating mobile station selects a carrier based on information regarding the destination mobile station, a channel switching time can be reduced during a call or communication, whereby channels can be effectively used.

According to the radio channel selecting method used in a mobile station to mobile station direct communications system of the present invention, since the originating mobile station selects a channel to be used based on information regarding the call number of the destination wireless handset, it can be avoided that a selecting operation rushes to a channel with a specific number. As a result, the use frequency of each channel can be averaged to effectively use channels.

According to the radio channel selecting method used in a wireless handset to wireless handset direct communications system of the present invention, since the originating mobile station sets as an initial value a value of n (natural number) plus a remainder obtained by dividing the call number of the destination mobile station by L (natural number), and selects a carrier to be used among j (natural number) radio carriers and selected at intervals of i (natural number), it can be avoided that a selecting operation rushes to a channel with a specific number. As a result, the use frequency of each channel can be averaged to effectively use channels.

According to the radio channel selecting method used in a mobile station to mobile station direct communications system of the present invention, the originating mobile station handset that selects a selectable carrier with a priority can reduce a channel detecting time.

According to the radio channel selecting method used in a mobile station to mobile station direct communications system of the present invention, since the originating mobile station selects a carrier based on information regarding the destination mobile station and the destination mobile station selects a carrier based on information regarding the destination mobile station itself, a channel to be switched during a call or communication can be detected in a short time and with reliability.

According to the radio channel selecting method used in a mobile station to mobile station direct communications system of the present invention, since the destination mobile station selects and retrieves channels based on information regarding the self call number, it can be avoided that a selecting operation rushes to a channel with a specific number. As a result, the use frequency of each channel can be averaged to effectively use channels.

According to the radio channel selecting method used in a mobile station to mobile station direct communications system of the present invention, the originating mobile station sets as an initial value a value of n (natural number) plus a remainder obtained by dividing the call number of the destination mobile station by L (natural number), and selects a carrier to be used among j (natural number) radio carriers and selected at intervals of i (natural number), and the destination mobile station sets as an initial value a value of n (natural number) plus a remainder obtained by dividing the call number of the destination mobile station by L (natural number), and selects a carrier to be used among j (natural number) radio carriers and selected at intervals of i (natural number). As a result, it can be avoided that a selecting operation rushes to a channel with a specific number. As a result, the use frequency of each channel can be averaged to effectively use channels.

According to the radio channel selecting method used in a mobile station to mobile station direct communications system of the present invention, the destination mobile station that selects a selectable carrier with a priority can reduce a channel detecting time.

According to the radio channel selecting method used in a mobile station to mobile station direct communications system of the present invention, the destination mobile station selects a selectable carrier with a priority based on a carrier used in past. Scanning the carrier used in the past with a priority can reduce the incoming call detecting time.

According to the radio channel selecting method used in a mobile station to mobile station direct communications system of the present invention, since the destination mobile station adjusts the retrieval frequency of a selectable carrier with a priority based on a carder used in past, the incoming call can be detected in a short time.

According to the present invention, the originating mobile station used in a mobile station to mobile station direct communications system includes carrier selecting means that selects a carrier used as a radio channel to be switched during a call or communication in accordance with information regarding the destination mobile station. Hence, a channel to be switched during a call or communication can be detected in a short time so that channels can be effectively used.

According to the originating mobile station used in a mobile station to mobile station direct communications system of the present invention, since the carrier selecting means selects a carrier based on information regarding the call number of the destination mobile station, it can be avoided that a selecting operation rushes to a channel with a specific number. As a result, the use frequency of each channel can be averaged to effectively use channels.

According to the originating mobile station used in a mobile station to mobile station direct communications system of the present invention, the carrier selecting means includes initial value setting means for setting as an initial value a value of n (natural number) plus a remainder obtained by dividing the call number of said destination mobile station by L (natural number); and carrier selecting means for selecting a carrier to be used among j (natural number) radio carriers and selected at intervals of i (natural number), based on said initial value set by means of said initial value setting means. Therefore, it can be avoided that a selecting operation rushes to a channel with a specific number. As a result, the use frequency of each channel can be averaged to effectively use channels.

According to the originating mobile station used in a mobile station to mobile station direct communications system of the present invention, since the carrier selecting means selects a selectable carrier with a priority, the channel can be detected in a short time.

Since the originating mobile station used in a mobile station to mobile station direct communications system of the present invention includes the carrier selection changing means that can change the carrier selection condition of the carrier selecting means, a user can arbitrarily change the carrier selection condition.

According to the originating mobile station used in a mobile station to mobile station direct communications system of the present invention, carrier selection changing means can change the carrier selection condition in accordance with information inputted via operating means added to the destination mobile station. Hence, a user can change easily the carrier selection condition.

Since the destination mobile station used in a mobile station to mobile station direct communications system of the present invention includes the carrier selecting means that can select the carrier of a radio channel to be detected during an incoming call or communication, based on the self terminal information, a channel to be switched during an incoming call detection or communication can be detected in a short time and with reliability.

According to the destination mobile station used in a mobile station to mobile station direct communications system of the present invention, the carrier selecting means selects a carrier based on the self call number information. Therefore, it can be avoided that a selecting operation rushes to a channel with a specific number. As a result, the use frequency of each channel can be averaged to effectively use channels.

According to the destination mobile station used in a mobile station to mobile station direct communications system of the present invention, the carrier selecting means includes initial value setting means for setting as an initial value a value of n (natural number) plus a remainder obtained by dividing the call number of said destination mobile station by L (natural number); and carrier selecting means for selecting a carrier to be used among j (natural number) radio carriers and selected at intervals of i (natural number), based on said initial value set by means of said initial value setting means. Therefore, it can be avoided that a selecting operation rushes to a channel with a specific number. As a result, the use frequency of each channel can be averaged to use effectively channels.

According to the destination mobile station used in a mobile station to mobile station direct communications system of the present invention, the carrier selecting means selects a selectable carrier with priority, whereby a channel can be detected in a short time.

According to the destination mobile station used in a mobile station to mobile station direct communications system of the present invention, carrier selecting means includes memory means for storing information regarding a carrier used in past, and selecting means for selecting a selectable carrier with a priority based on the carrier information used in the past stored in said memory means. Hence, the carrier used in the past can be scanned with priority. This leads to a short-time incoming call detection operation.

According to the destination mobile station used in a mobile station to mobile station direct communications system of the present invention, the carrier selecting means includes memory means for storing information regarding a carrier used in the past, and means for adjusting a selectable carrier with a retrieval frequency of the selectable carrier based on the carrier information used in the past stored in the memory means. As a result, an incoming call detection can be reduced.

According to the destination mobile station used in a mobile station to mobile station direct communications system of the present invention, since the carrier selection changing means changes the carrier selection condition of the carrier selecting means, the carrier used in the past is scanned with priority. This result in a reduced detection time of an incoming call.

Furthermore, since the incoming call detection time is reduced, the electric power consumption can be suppressed by prolonging the incoming call detection duty.

According to the destination mobile station used in a mobile station to mobile station direct communications system of the present invention, the carrier selection changing means changes the carrier selection condition in accordance with information inputted via operating means added to the originating mobile station. The incoming call detection time can be shortened.

BRIEF DESCRIPTION OF THE DRAWINGS

FIGS. 9(a) to 9(d) are schematic diagrams each used for storing a carrier number into a memory according to the present invention;

DESCRIPTION OF THE PREFERRED EMBODIMENTS

Figure 1:
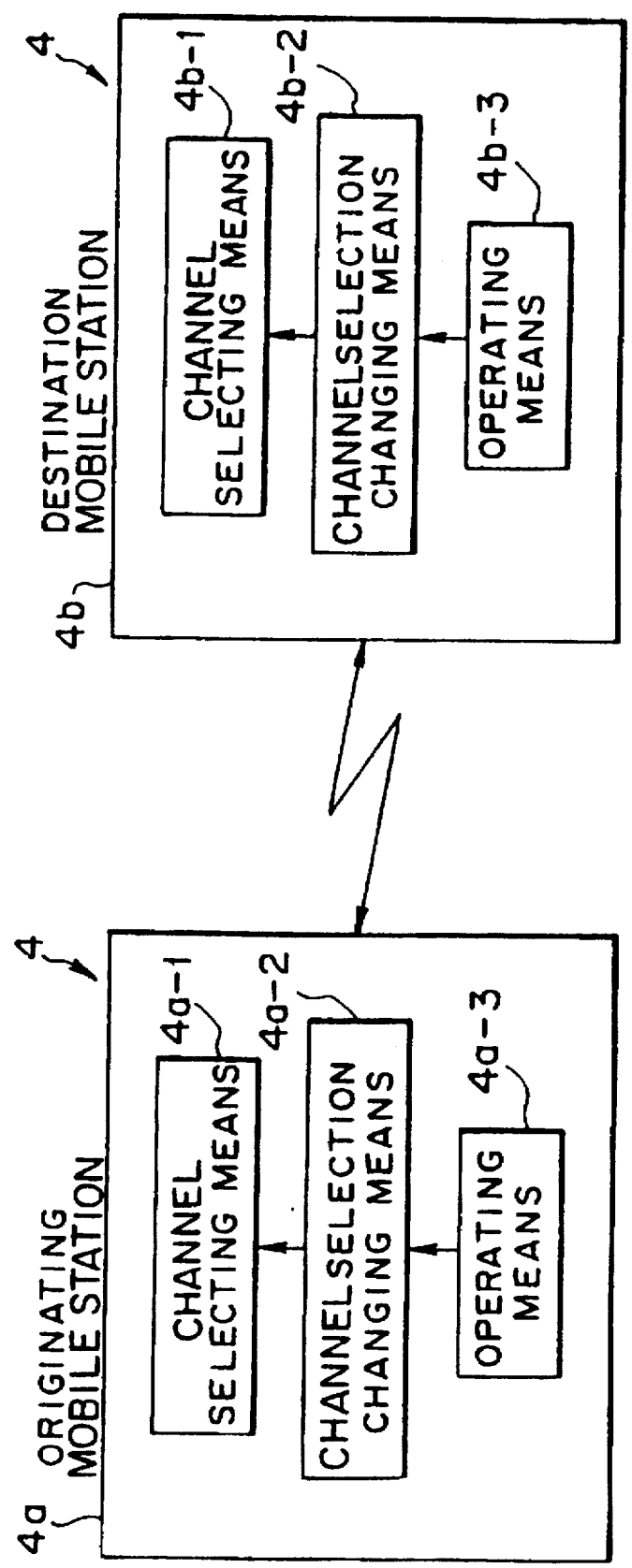
FIG. 1 is a block diagram showing an aspect of the present invention.

Referring to the attached drawings, explanation will be made in detail as for preferred embodiments according to the present invention. (a) The aspect of the invention FIG. 1 is a block diagram used for explaining an aspect of the present invention. Numeral 4 represents a digital cordless telephone set acting as a mobile station used in a personal handy phone system. Numeral 4a represents an originating mobile station and 4b represents a destination mobile station.

The originating mobile station 4a includes carrier selecting means 4a-1, carrier selection changing means 4a-2, and operating means 4a-3. The carrier selecting means 4a-1 selects a carrier used as a radio channel to be switched during a call or communication, based on information regarding the destination mobile station 4b.

The carrier selecting means 4a-1 may be constituted so as to select a carrier based on information regarding the call number of the destination mobile station 4b.

The carrier selecting means 4a-1 includes initial value setting means for setting as an initial value a value of n (natural number) plus the remainder obtained by dividing a call number of the destination mobile station 4b by L (natural number), and means for selecting a carrier used among j (natural number) radio carriers at intervals of i (natural number), based on the initial value set by means of the initial value setting means.

The carrier selecting means 4a-1 selects a selectable carrier with a priority.

Moreover, the carrier selecting means 4a-1 may include the carrier selection changing means 4a-2 that changes the carrier selecting condition of the carrier selecting means 4a-1.

The carrier selection changing means 4a-2 changes the carrier selecting condition of the carrier selecting means 4a-1 in accordance with information inputted via the operating means 4a-3.

The operating means 4a-3 is means added to the originating mobile station 4a.

Like the originating mobile station 4a, the destination mobile station 4b includes carrier selecting means 4b-1, carrier selection changing means 4b-2, and operating means 4b-3. The carrier selecting means 4b-1 selects a carrier used as a radio channel to be switched during a call or communication, based on information regarding the destination mobile station 4b.

The carrier selecting means 4b-1 selects a carrier based on information regarding the call number of the destination mobile station 4b.

The carrier selecting means 4b-1 may include initial value setting means for setting as an initial value a value of n (natural number) plus the remainder obtained by dividing a call number of the destination mobile station 4b by L (natural number), and means for selecting a carrier used among j (natural number) radio carriers at intervals of i (natural number), based on the initial value set by means of the initial value setting means.

The carrier selecting means 4b-1 selects a selectable carrier with a priority.

Moreover, the carrier selecting means 4b-1 may include the carrier selection changing means 4b-2 that changes the carrier selection condition of the carrier selecting means 4b-1.

The carrier selection changing means 4b-2 changes the carrier selection condition of the carrier selecting means 4b-1 in accordance with information inputted via the operating means 4b-3.

The operating means 4b-3 is means added to the originating mobile station 4b.

In the invention described above, when a direct communication between mobile stations used in the cordless telephone system is performed via no base station 5, the originating mobile station 4a selects a carrier used as a radio channel to be switched during a cell or communication, based on information regarding the destination mobile station 4b.

The originating mobile station 4a selects a carrier used as a radio channel to be switched during a call or communication, based on information regarding the call number of the destination mobile station 4b.

In order to use a carrier as a radio channel to be switched during a call or communication, the originating mobile station 4a selects a carrier used among j (natural number) radio carriers at intervals of i (natural number), as an initial value a value of n (natural number) plus the remainder obtained by dividing a call number of the destination mobile station 4b by L (natural number)).

The originating mobile station 4a selects a selectable carrier with a priority as a radio channel to be switched during a call or communication.

When a direct communication is performed between mobile station used in a cordless telephone system without relaying via the base station 5, the originating mobile station 4a selects a carrier to be used as a radio channel to be switched during a call or communication, based on information regarding the destination mobile station 4b, while the destination mobile station 4b selects a carrier at a time of retrieving a radio channel to be switched during an incoming call or communication, based on information regarding the destination mobile station 4b itself.

Moreover, the originating mobile station 4a selects a carrier used as a radio channel to be switched during a call or communication, based on information regarding a call number of the destination mobile station 4b, while the destination mobile station 4b selects a carrier at a time of retrieving a radio channel to be switched during a destination call or communication, based on information regarding the destination mobile station 4b itself.

When the originating mobile station 4a selects as a radio channel to be selected during a call or communication, a carrier used among j (natural number) radio carriers at intervals of i (natural number), as an initial value a value of n (natural number) plus the remainder obtained by dividing a call number of the destination mobile station 4b by L (natural number). When the destination mobile station 4b selects a carrier used as a radio channel to be selected during an incoming call or communication, a carrier used among j (natural number) radio carriers at intervals of i (natural number), as an initial value a value of n (natural number) plus the remainder obtained by dividing a call number of the destination mobile station 4b by L (natural number).

The destination mobile station 4b selects a selectable carrier with a priority at a retrieval time of a radio channel to be selected during an incoming call or communication.

At a retrieval time of a radio channel to be selected during an incoming call or communication, the destination mobile station 4b selects a selectable carrier with a priority based on a carrier used in the past.

At a retrieval time of a radio channel to be selected during an incoming call or communication, the destination mobile station 4b adjusts the retrieval frequency of a selectable carrier with a priority based on a carrier used in the past.

As for the radio channel selecting method described above, the originating mobile station 4a or the destination mobile station 4b functions as follows:

First the originating mobile station 4a will be explained below.

In the originating mobile station 4a used in the mobile station to mobile station direct communications system according to the present invention, the carrier selecting means 4a-1 selects a carrier used as a radio channel to be selected during a call or communication based on information regarding the destination mobile station 4b.

The carrier selecting means 4a-1 selects information regarding the call number of the destination mobile station 4b. As for the carrier selecting means 4a-1 in the originating mobile station 4a of the present invention, the initial value setting means sets as an initial value a value of n (natural number) plus the remainder obtained by dividing a call number of the destination mobile station 4b by L (natural number), and carrier selecting means selects a carrier used among j (natural number) radio carriers at intervals of i (natural number), based on an initial value set by means of the initial value setting means.

The carrier selecting means 4a-1 selects a selectable carrier with a priority.

The carrier selection changing means 4a-2 changes the carrier selection condition of the carrier selecting means 4a-1.

The carrier selection changing means 4a-2 changes the carrier selection condition, based on information inputted via the operating means 4a-3 added to the originating mobile station 4a.

Next, in the destination mobile station 4b used in the mobile station to mobile station direct communications system, the carrier selecting means 4b-1 selects a carrier at a retrieval operation of a radio channel to be selected during an incoming call or communication, based on information regarding the self terminal.

The carrier selecting means 4b-1 selects a carrier based on information regarding the self call number.

In the carrier selecting means 4b-1, the initial value setting means sets as an initial value a value of n (natural number) plus the remainder obtained by dividing a call number of the destination mobile station 4b by L (natural number), and carrier selecting means selects a carrier used among j (natural number) radio carriers at intervals of i (natural number), based on an initial value set by means of the initial value setting means.

The carrier selecting means 4b-1 selects a selectable carrier with a priority.

The carrier selecting means 4b-1 selects a selectable carrier with priority, based on carrier information used in the past and stored by memory means.

The carrier selecting means 4b-1 adjusts the retrieval frequency of a selectable carrier, based on carrier information used in the past and stored by memory means.

The carrier selection changing means 4b-2 changes the carrier selection condition of the carrier selecting means 4b-1.

Moreover, the carrier selection changing means 4b-2 changes the carrier selection condition based on information inputted via the operating means 4b-3 added to the originating mobile station 4a.

As described above, according to the radio channel selecting method in the mobile station to mobile station direct communications system, the originating mobile station handset 4a selects a carrier based on information regarding the destination mobile station 4b, it can reduce the detection time of a channel to be switched during a call or communication, whereby channels can be used effectively.

According to the radio channel selecting method in the mobile station to mobile station direct communications system, the originating mobile station 4a selects a channel based on information regarding the call number of the destination mobile station 4b, it can be avoided that a channel selection operation concentrates on a channel of a specific number, whereby the use frequency of each channel is averaged and the channels can be used effectively.

According to the radio channel selecting method in the mobile station to mobile station direct communications system, the originating mobile station 4a selects as an initial value a value of n (natural number) plus the remainder obtained by dividing a call number of the destination wireless handset 4b by L (natural number), a carrier used among j (natural number) radio carriers at intervals of i (natural number). As a result, a channel selecting operation does not concentrate on a channel of a specific number, whereby the use frequency of each channel is averaged and the channels can be used effectively.

Moreover, according to the radio channel selecting method in the mobile station to mobile station direct communications system, since the originating mobile station 4a selects a selectable carrier with a priority, the channel detection time can be reduced.

According to the radio channel selecting method in the mobile station to mobile station direct communications system, since the originating mobile station 4a selects a carrier based on information regarding the destination mobile station 4b while the destination mobile station 4b selects a carrier based on information regarding the destination mobile station 4b itself, the time of detecting a channel to be switched during an incoming call or communication can be reduced with reliability.

According to the radio channel selecting method in the mobile station to mobile station direct communications system, the destination mobile station 4b selects a channel based on information regarding the self call number information to retrieve the channels. As a result, a channel selecting operation does not concentrate on a channel of a specific number, whereby the use frequency of each channel is averaged and the channels can be used effectively.

According to the radio channel selecting method in the mobile station to mobile station direct communications system, the destination mobile station 4a selects as an initial value a value of n (natural number) plus the remainder obtained by dividing a call number of the destination mobile station 4b by L (natural number), a carrier used among j (natural number) radio carriers at intervals of i (natural number). The destination mobile station 4b selects as an initial value a value of n (natural number) plus the remainder obtained by dividing a call number of the destination wireless handset 4b by L (natural number), a carrier used among j (natural number) radio carriers at intervals of i (natural number). Hence since the channel selecting operation does not concentrate on a channel of a specific number, the use frequency of each channel is averaged and channels can be effectively used.

According to the radio channel selecting method in the mobile station to mobile station direct communications system, since the destination mobile station 4b selects a selectable carrier with a priority, the channel detection time can be reduced.

According to the radio channel selecting method in the mobile station to mobile station direct communications system, since the destination mobile station 4b selects a selectable carrier with a priority based on a carrier used in the past, the carrier used in the past can be scanned With a priority, whereby an incoming call detection time can be reduced.

According to the radio channel selecting method in the mobile station to mobile station direct communications system, since the destination mobile station 4b adjusts the use frequency of a selectable carrier based on a carrier used in the past, the destination detection time can be reduced.

Since an originating mobile station used in the mobile station to mobile station direct communications system according to the present invention includes the carrier selecting means 4a-1 that selects a carrier used as a radio channel to be selected during a call or communication based on information regarding the destination mobile station 4b, the time during which a channel to be selected is detected during a call or communication can be reduced so that channels can be effectively used.

According to the originating mobile station used in the mobile station to mobile station direct communications system, since the carrier selecting means 4a-1 selects a carrier based on information regarding the call number of the destination mobile station 4b, a channel with a specific number is not selected heavily. Hence, the use frequency of each channel can be averaged to use effectively channels.

According to the originating mobile station used in the mobile station to mobile station direct communications system of the present invention, the carrier selecting means 4a-1 includes initial value setting means for setting as an initial value a value of n (natural number) plus the remainder obtained by dividing a call number of the destination wireless handset 4b by L (natural number), and means for selecting a carrier used among j (natural number) radio carriers at intervals of i (natural number). Hence, since the channel selecting operation does not concentrate on a channel of a specific number, the use frequency of each channel can be averaged to use effectively channels.

According to the originating mobile station used in the wireless handset to mobile station direct communications system of the present invention, since the carrier selecting means 4a-1 selects a selectable carrier with a priority, a channel can be detected in a short time.

The originating mobile station used in the mobile station to mobile station direct communications system of the present invention includes a carrier selection changing means 4a-2 to change the carrier selection condition of the carrier selecting means 4a-1. Hence, a user can desirably change the carrier selecting condition.

According to the originating mobile station used in the mobile station to mobile station direct communications system of the present invention, since the carrier selection changing means 4a-2 changes the carrier selection condition, based on information inputted via the operation means 4a-3 added to the originating mobile station 4a, a user can readily change the carrier selecting condition.

Since the destination mobile station used in the mobile station to wireless handset direct communications system of the present invention includes carrier selecting means 4b-1 that selects a carrier when a radio channel detection to be switched is retrieved during a call or communication, based on the self terminal information, a channel to be selected during an incoming call or communication can be detected with reliability and in a short time.

Since the destination mobile station used in the mobile station to mobile station direct communications system of the present invention includes carrier selecting means 4b-1 that selects a carrier based on information regarding the self call number, a selected channel does not concentrate on a channel of a specific number, whereby the use frequency of each channel is averaged to use channels effectively.

According to the destination mobile station used in the mobile station to mobile station direct communications system of the present invention, the carrier selecting means 4b-1 includes initial value setting means for setting as an initial value a value of n (natural number) plus the remainder obtained by dividing a call number of the destination mobile station 4b by L (natural number)), and means for selecting a carrier used among j (natural number) radio carriers at intervals of i (natural number), based on an initial value set by the initial value setting means. Hence, the channel selecting operation does not concentrate on a channel of a specific number so that the use frequency of each channel is averaged to put channels in an effective use.

According to the destination mobile station used in the mobile station to mobile station direct communications system of the present invention, the carrier selecting means 4b-1 can select a selectable carrier with a priority to detect a channel in a short time.

According to the destination mobile station used in the mobile station to mobile station direct communications system of the present invention, the carrier selecting means 4b-1 includes memory means for storing information regarding a carrier used in the past, and means for selecting a selectable carrier with a priority based on information regarding the carrier stored in the memory means. Hence, the carrier used in the past can be scanned with a priority so that the destination detection time can be reduced.

According to the destination mobile station used in the mobile station to mobile station direct communications system of the present invention, the carrier selecting means 4b-1 includes memory means for storing information regarding a carrier used in the past, and means for adjusting the retrieval frequency of a selectable carrier with a priority, based on information regarding the carrier used in the past stored in the memory means. Hence, the incoming call can be detected in a short time.

According to the destination mobile station used in the mobile station to mobile station direct communications system of the present invention, since the carrier selection changing means 4b-2 changes the carrier selection condition of the carrier selecting means 4b-1, the carrier used in the past can be scanned with a priority, whereby the incoming call can be detected in a short time.

Reducing the incoming call detection can suppress electric power consumption by widening the period between incoming call detecting operations.

According to the destination mobile station used in the mobile station to mobile station direct communications system of the present invention, the carrier selection changing means 4b-2 changes the carrier selecting condition in accordance with information inputted via the operating means added to the originating mobile station 4a. Hence, the incoming call can be detected in short time.

(b) Explanation of First Embodiment

Figure 2:
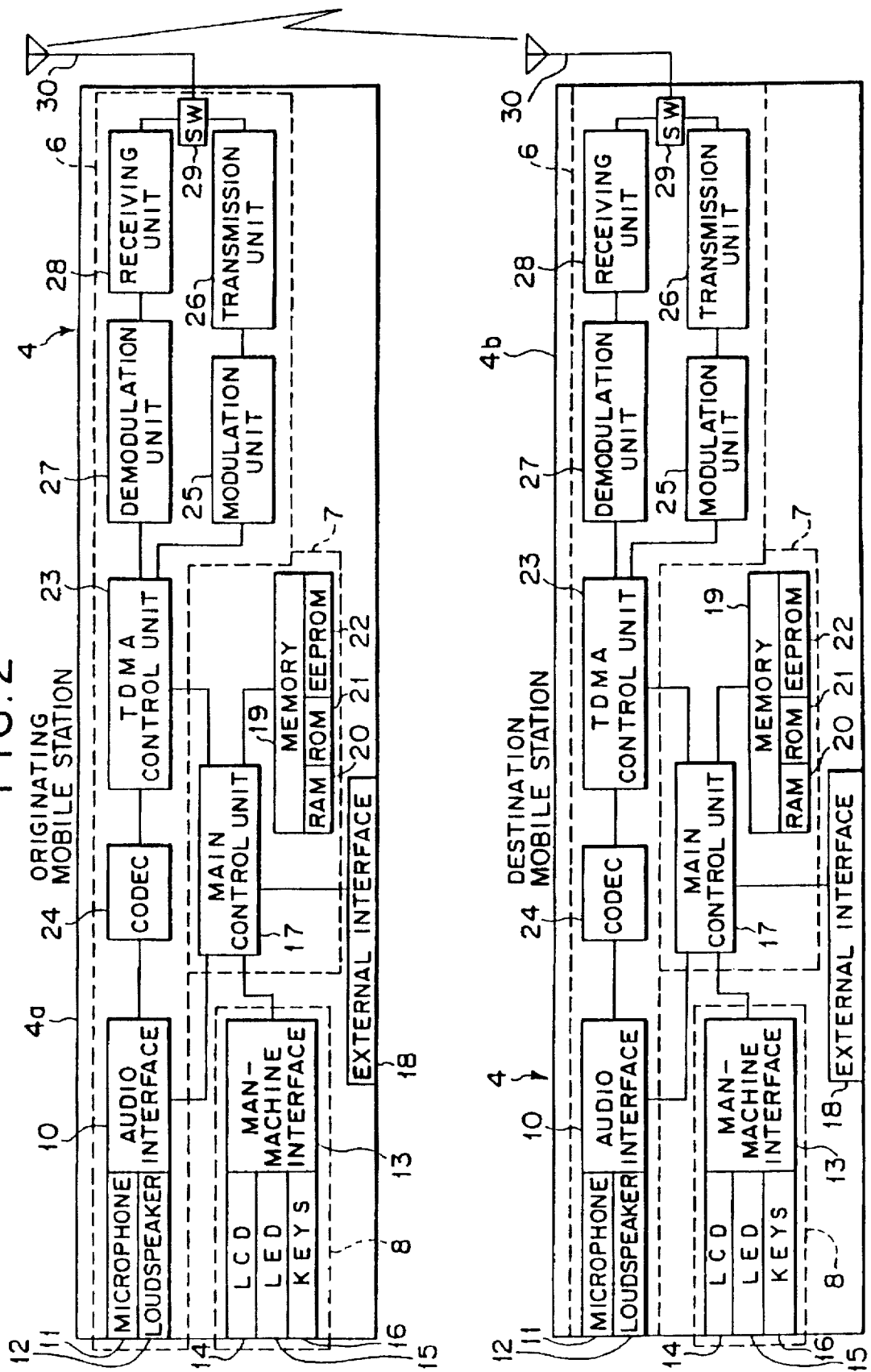
FIG. 2 is a block diagram showing schematically the first embodiment according to the present invention.
Figure 7:
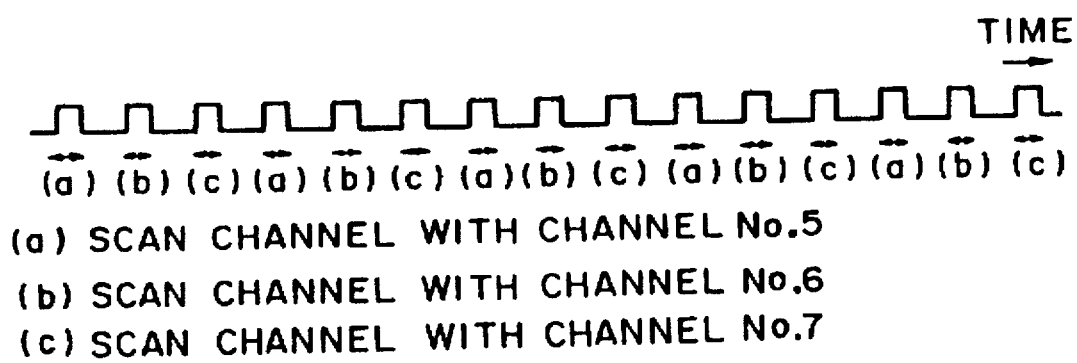
FIG. 7 is a time chart showing an incoming call detection pattern according to the present invention.
Figure 8:
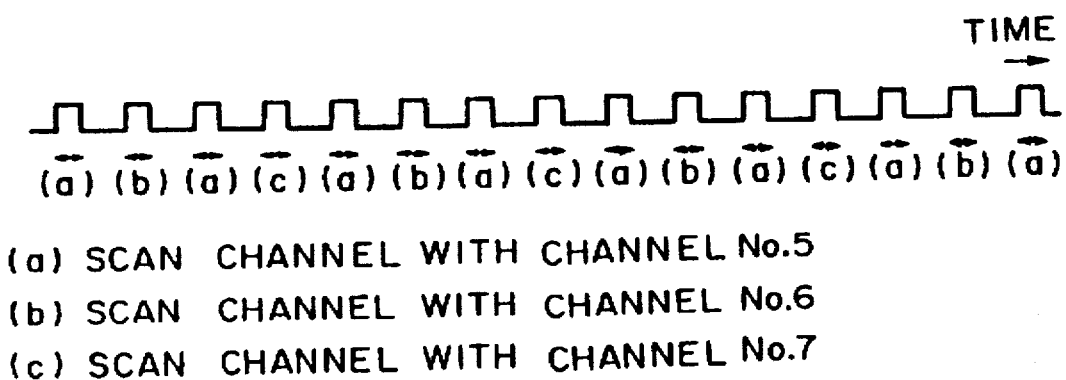
FIG. 8 is a time chart showing an incoming call detection pattern according to the present invention.
Figure 10:
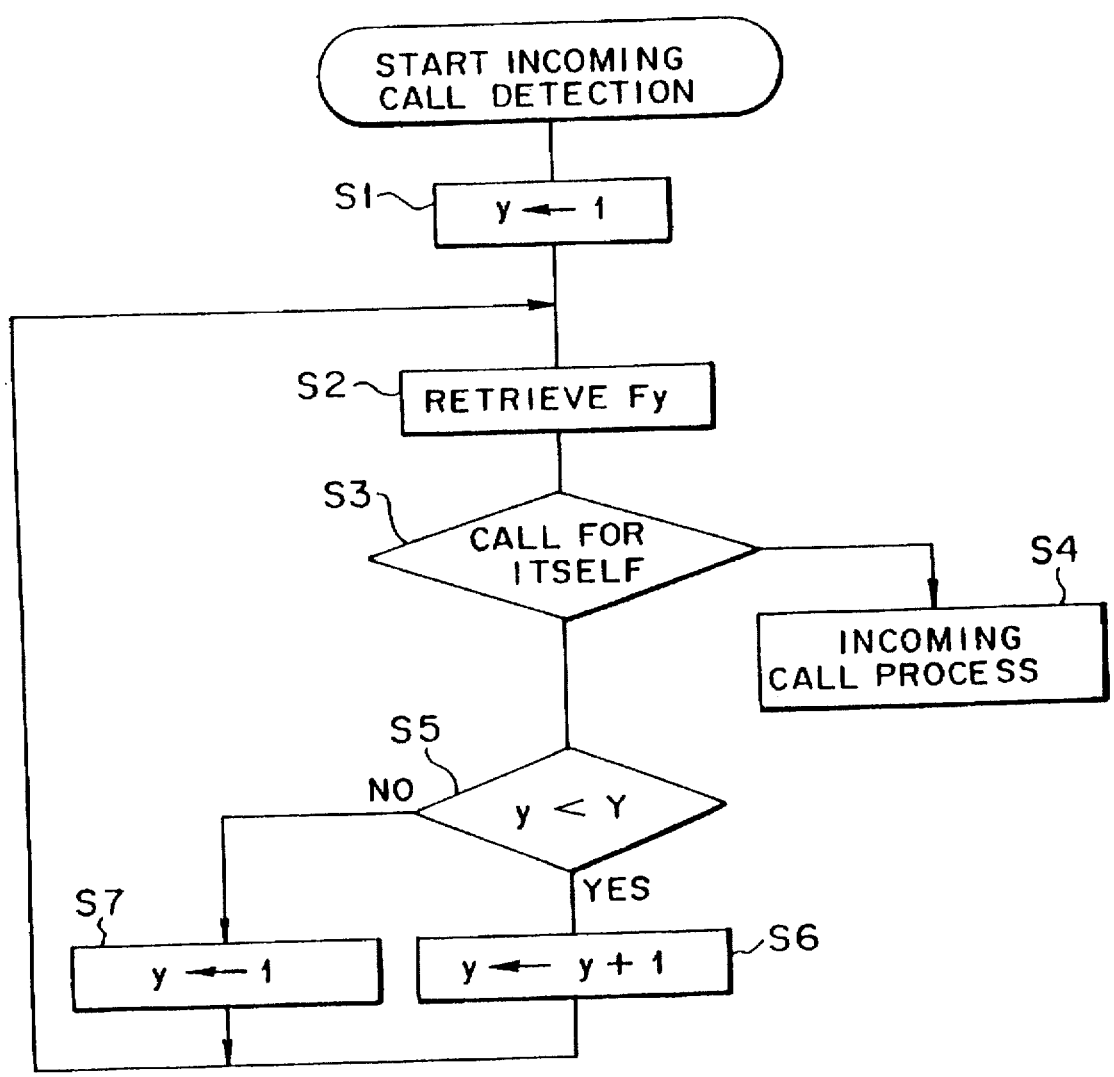
FIG. 10 is a flow chart for a channel retrieval at an incoming call detection, according to the present invention.
Figure 11:
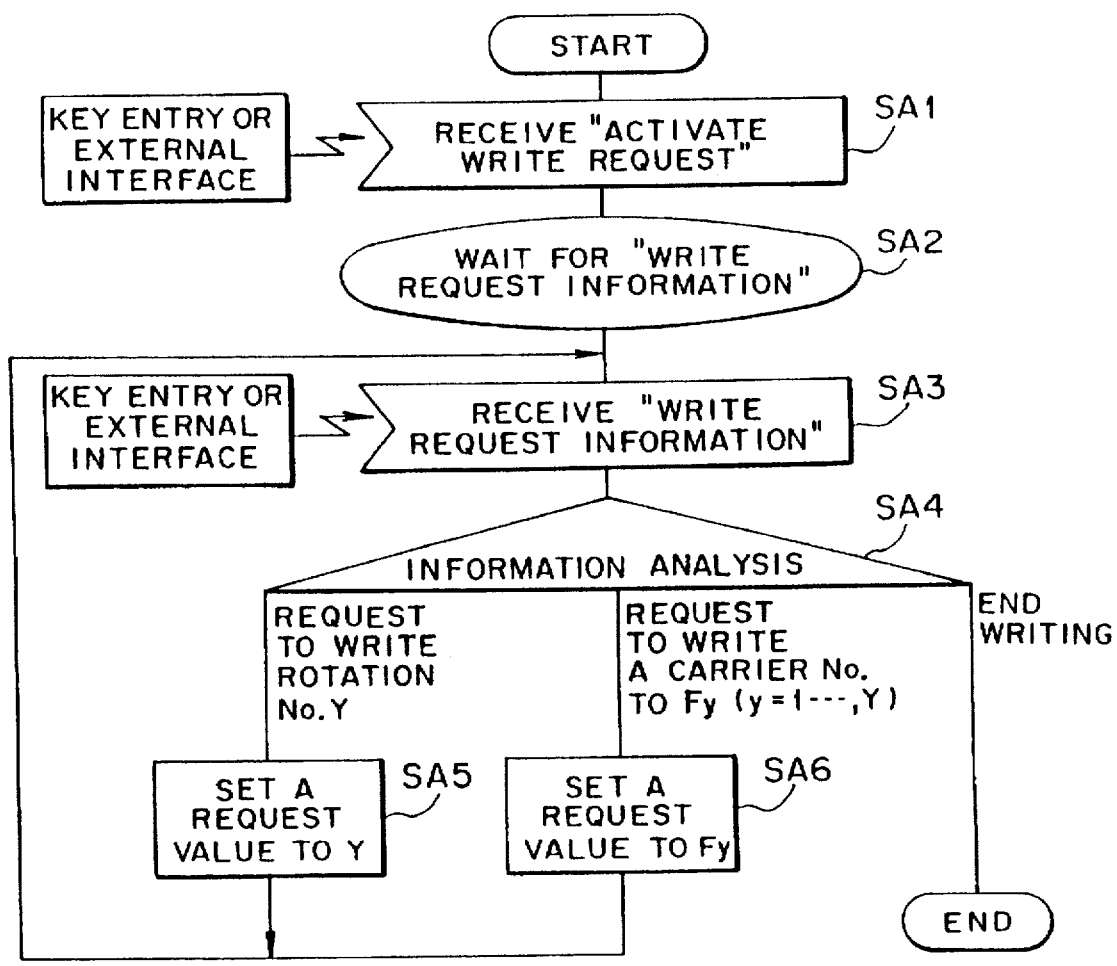
FIG. 11 is a flow chart showing an algorithm for the main control unit within a destination mobile station, according to the present invention.
Figure 12:
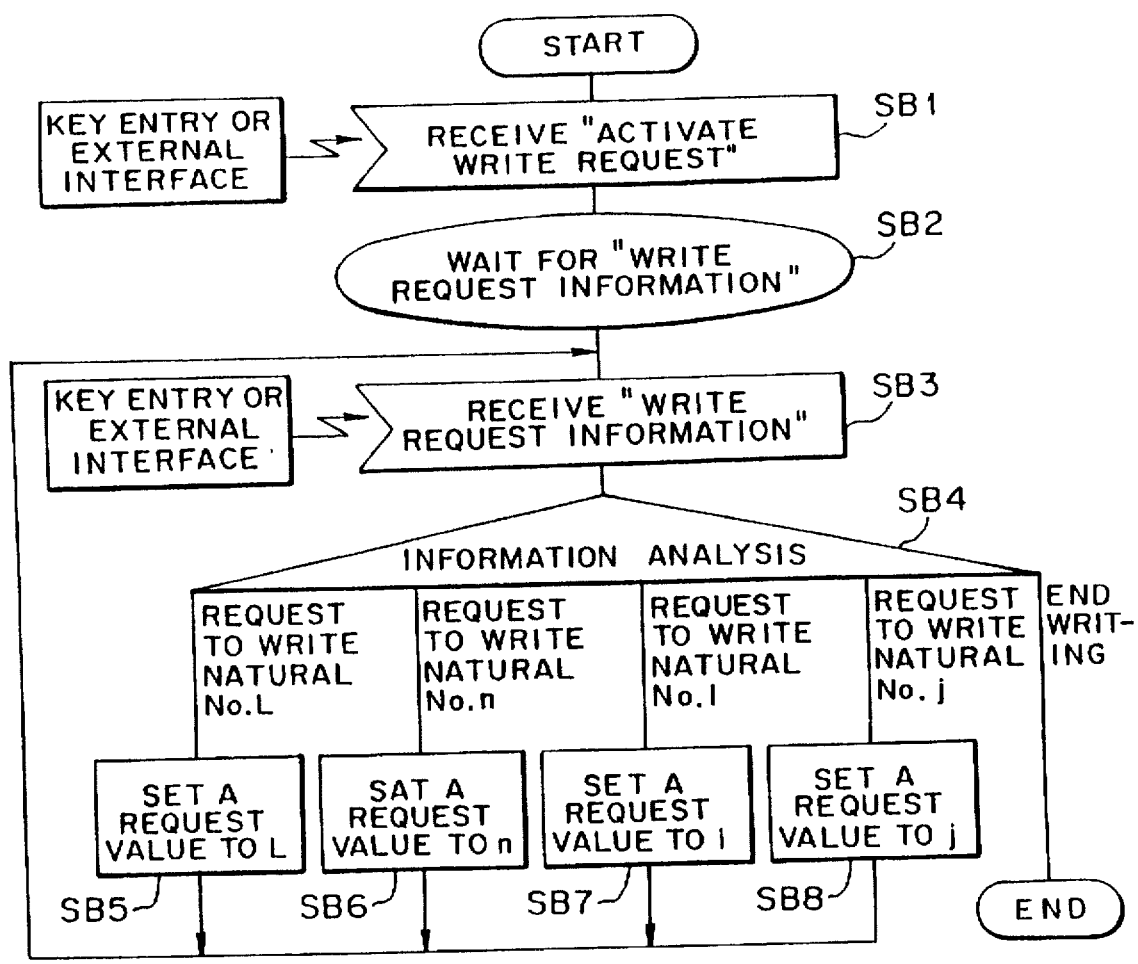
FIG. 12 is a flow chart showing an algorithm for the main control unit within a mobile station, according to the present invention.
Figure 13:
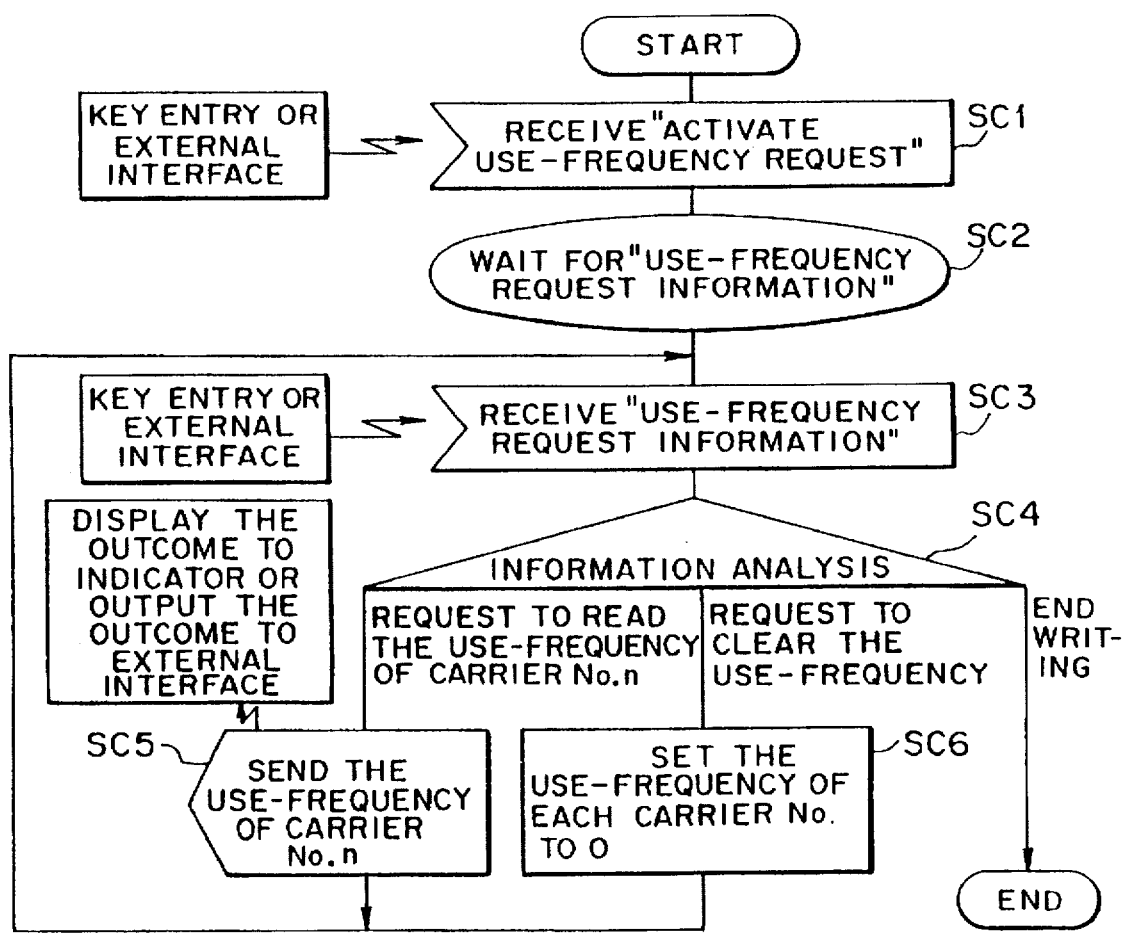
FIG. 13 is a flow chart showing an algorithm for the main control unit within a mobile station, according to the present invention.
Figure 14:
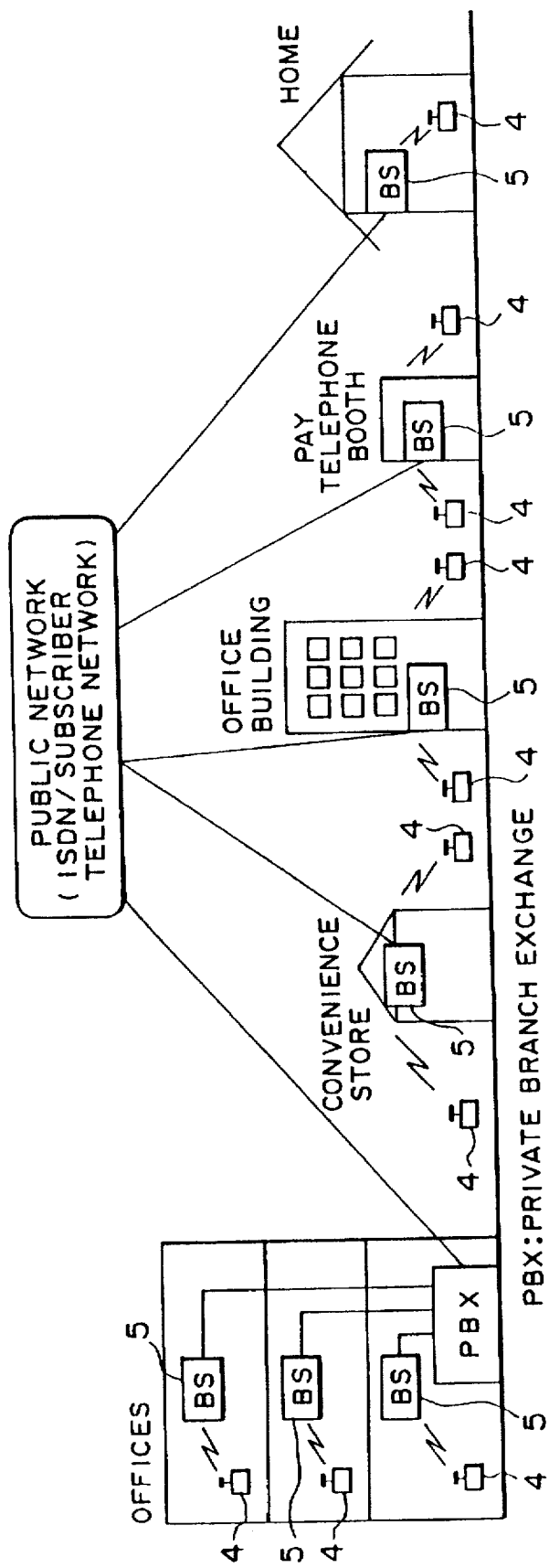
FIG. 14 is a schematic diagram used for explaining a personal handy phone system.
Figure 15:
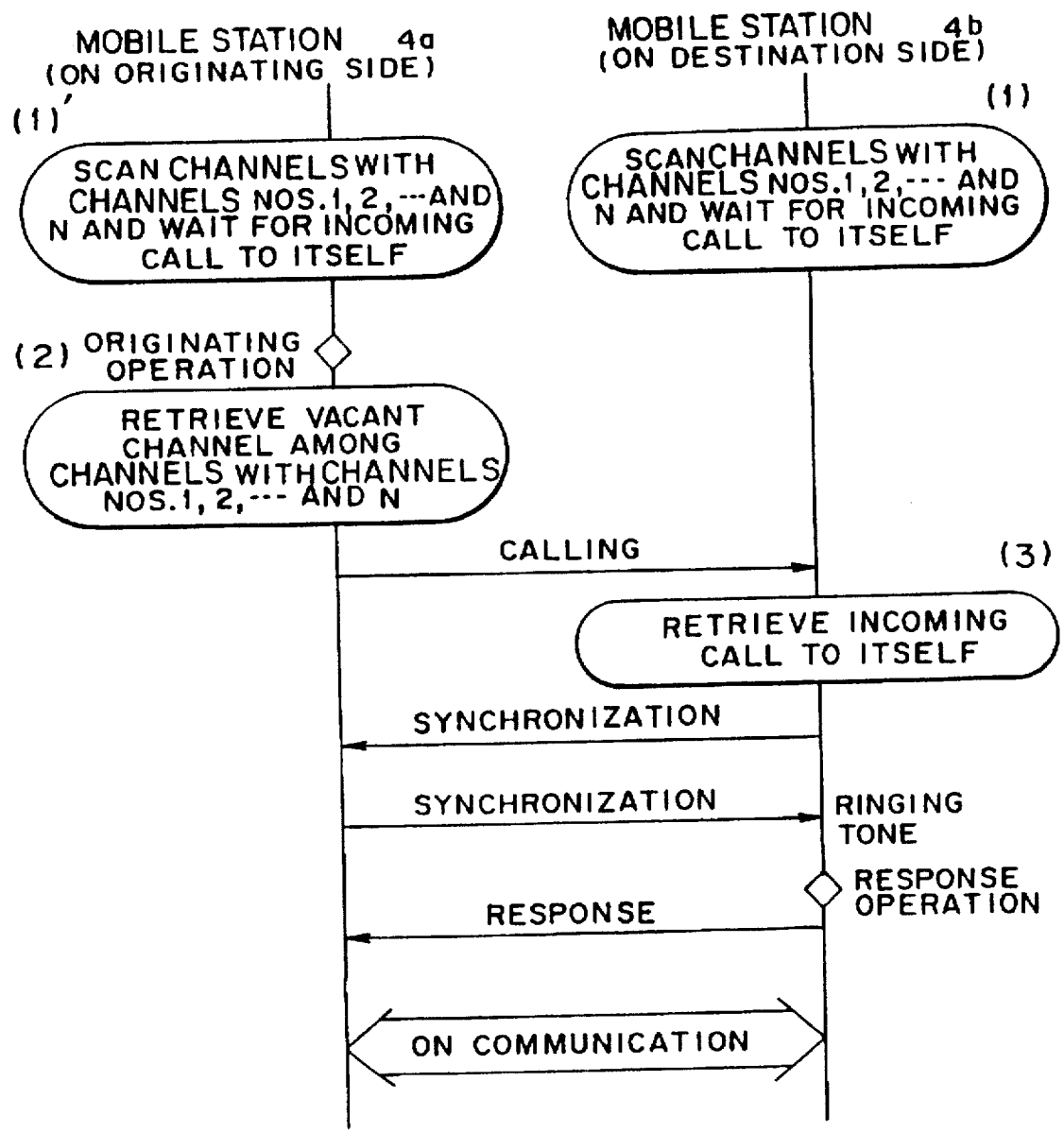
FIG. 15 is a diagram used for explaining a radio channel selecting method applicable for a mobile station to mobile station direct communications system.
Figure 16:
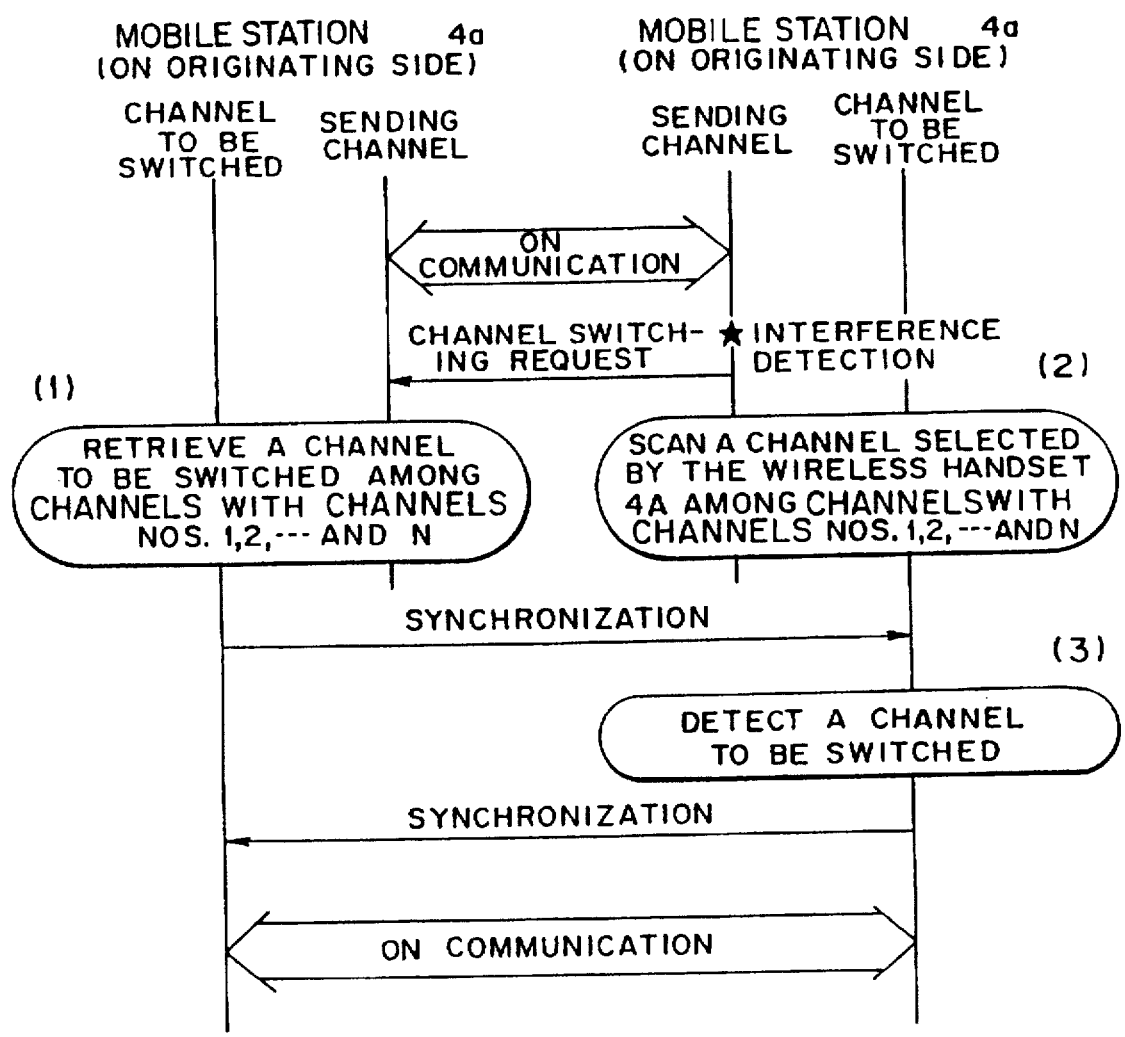
FIG. 16 is a diagram used for explaining a radio channel selecting method applicable for a mobile station to mobile station direct communications system.

The embodiment of the present invention will be explained below with reference to the attached drawings. FIG. 2 is a schematic block diagram showing the first embodiment according to the present invention. FIGS. 3 to 6 are diagrams each used for explaining a radio channel selecting method in a mobile station to mobile station direct communications system. FIGS. 7 and 8 show time charts each showing an incoming call detection pattern. FIGS. 9(a) to 9(d) are schematic diagrams each used for explaining a process of recording carrier numbers into a memory. FIG. 10 is a flow chart for performing a channel retrieval at an incoming call detection time. FIGS. 11 to 13 are flow charts each for explaining an algorithm for the main control unit within the mobile station.

Referring to FIG. 2, numeral 4 represents a digital cordless telephone set 4 acting as a radio portable terminal. The digital cordless telephone set 4 is used for a personal handy phone or a cordless telephone system, and can communicate directly between mobile station without relaying via the base station.

The digital cordless telephone set 4, which has an originating and destination function, is formed of a transmit/receive system 6, a control system 7, and an operating display system 8, as shown in FIG. 2.

In each digital cordless telephone set 4, the transmit/receive system 6 is constituted of an audio interface 10 formed of a microphone 11 and a loudspeaker 12, a codec 24, a TDMA control unit 23, a modulation unit 25, a transmitting unit 26, a switching unit 29 acting as a hybrid circuit, a receiving unit 28, a demodulation unit 27, an antenna 30, and other elements.

The control system 7 is constituted of a main control unit 17 and a memory 19. The memory 19 is formed of a RAM 20, a ROM 21, and an EEPROM 22.

The operating display system 8 is constituted of a man-machine interface 13 including a liquid crystal display (LCD) 14, a light emitting diode (LED) 15, and a ten-key and function-key board 16. The external interface 18 performs a communication control with personal computer or the like.

In the transmit/receive system 6 within each digital cordless telephone set 4, the audio 10 receives audio with the microphone 11 and reproduces it with the loud speaker 12. The codec 24 codes and decodes audio received by the audio interface 10. The TDMA control unit 23 is a control unit that performs a time sharing multiplex access control to subject a chain of bits of each signal from the codec 24 to a time sharing multiplex access control.

When the digital cordless telephone set 4 sends a call, the codec 24 codes a signal inputted via the microphone 11 to send the result to the modulation unit 25 via the TDMA control unit 23. The modulation unit 25 converts the result into a modulation signal suitable for transmission. The transmission unit 26 allows the modulation unit 25 to execute a frequency modulation. Then, the antenna 30 radiates a radio wave via the switching unit 29.

When a call is received with the digital cordless telephone set 4, the radio wave is sensed by the antenna 30 to send it as a signal to the receiving unit 28 via the switching unit 29. Moreover, the demodulation unit 27 demodulates the modulated signal. Then, the demodulation signal is decoded into an audio signal via the TDMA control unit 23 and the codec 24. The loudspeaker 12 within the audio interface 10 produces the audio signal and then the telephone call is received.

Next, in the explanation of the control system 7, the main control unit 17 accesses the audio interface 10, the memory 19, or the TDMA control unit 23 at a transmit/receive time to perform various controls. In order to select a channel during a direct communication between mobile station (to be described later), the main control unit 17 performs an important act, together with the memory 19.

Regarding the operating display system 8, the ten-key and function-key board 16 on the man machine interface 13 is an operating input unit to perform an operation necessary for communications. Both the liquid crystal display (LCD) 14 and the light emitting diode (LED) 15 provide information necessary for a user by means of medium except audio.

For example, for a telephone call, when an opposite party's call number (telephone number) is inputted by operating the ten-key and function-key board 16, the LCD 14 displays the opposite party's telephone number or the communication time.

The LED 15 is illuminated during communications in accordance with a radio wave receiving state or tells the remaining energy of the power source for the cordless telephone set. This feature improves the ease of use of a cordless telephone set. In addition, the operability can be improved in dark places by blinking the LED 15 synchronously with a ringing tone when an opposite party's call is detected.

As described above, the personal handy phone system includes plural channels for direct communications between mobile station. When the originating mobile station 4a locates an unassigned channel, it communicates directly with a mobile station via the unassigned channel, without using the base station or transponder.

In this case, the originating mobile station 4a selects a call carrier (channel). The destination mobile station 4b detects a channel selected by the originating mobile station 4a at an incoming call detection time.

In addition to the originating or incoming call time, when radio interference is detected during a direct communication between mobile station, a channel can be selected in the same manner as that described above.

This carrier selecting procedure is performed by the carrier selecting means built-in the digital cordless telephone set 4. As described above, the main control unit 17 and the memory 19 have the function corresponding to the carrier selecting means, respectively.

The carrier selecting means selects some carriers as candidates based on information regarding the destination mobile station 4b to retrieve a vacant channel among carriers.

In both the originating mobile station 4a and the destination mobile station 4b, the carrier selecting means selects some channels based on inherent information regarding the destination mobile station 4b, to detect a vacant channel among the selected channels. Thus, some channels are selected based on the call number of the destination mobile station 4b.

In a concrete explanation on the carrier (channel) selecting method, if 1, 2, ... N carriers in total are allocated for direct communications between mobile station, the initial value setting means, which is arranged in the carrier selecting means within the originating mobile station 4a and the destination mobile station 4b, sets as an initial value n (natural number) plus (|MOD L|+n) being a remainder obtained by dividing the call number of said destination mobile station 4b by L (natural number), and selects a carrier candidate used among j (natural number) radio carriers at an intervals of i (natural number).

In this embodiment, the initial value is set by the expression of L=N, where L is a natural number and N is the total number of carriers decided for a direct communication between mobile station.

If it is assumed that the carrier selection conditions are N=10, n=1, i=1, and j=3, and the call number of the destination mobile station 4b is 1234, the carrier numbers "5", "6", or "7" is selected as a carrier of a channel to be switched during a call, an incoming call detection, or communication.

This is because three (j) values is selected (continuously) at intervals of 1(i) from an initial value 5, the initial value being a value of 1(n) plus 4 being the remainder obtained by dividing the call number of 1234 by 10(N).

Figure 3:
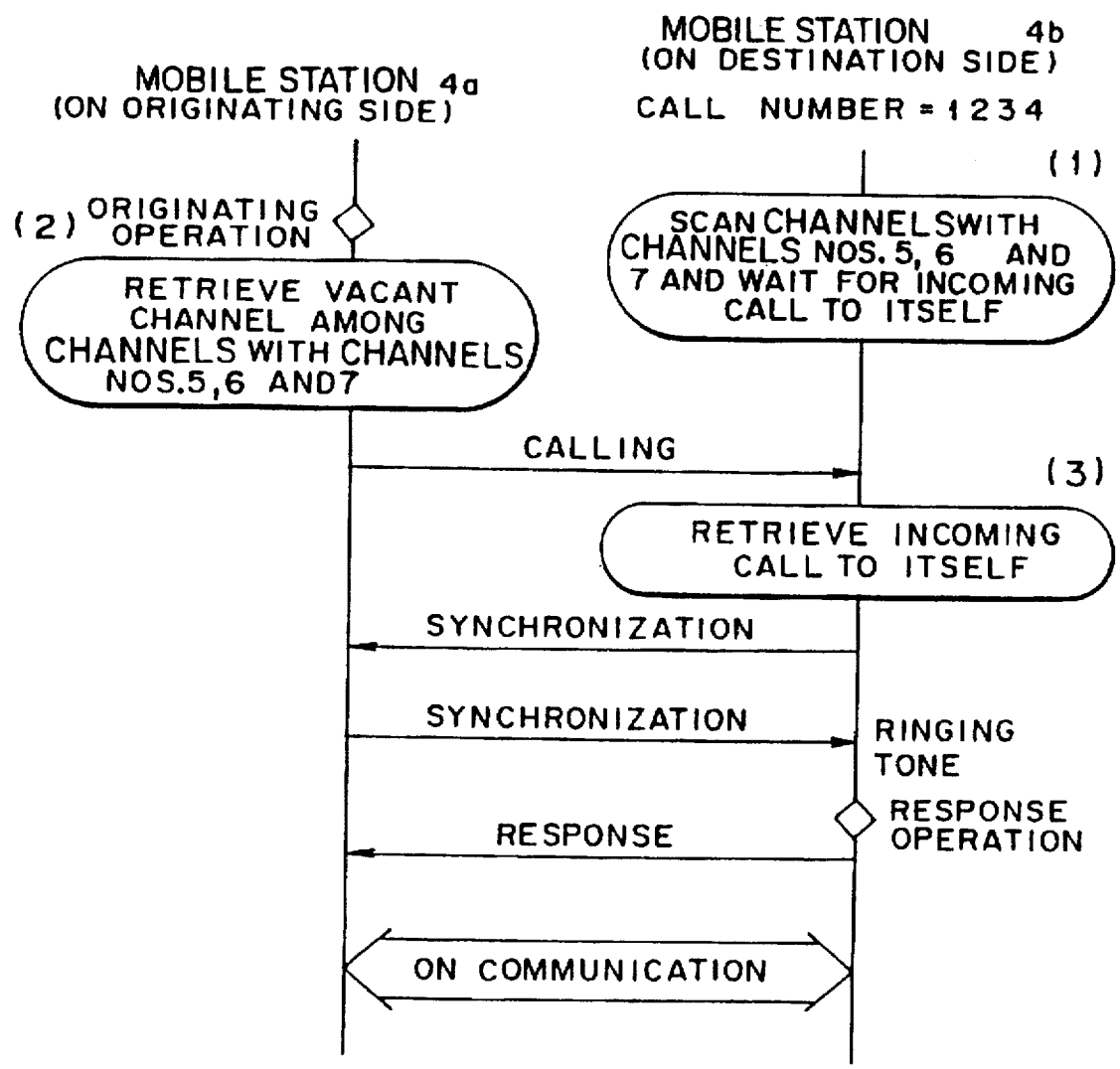
FIG. 3 is a diagram used for explaining a radio channel selecting method applicable for a mobile station to mobile station direct communication system according to the present invention.

As shown in FIG. 3, in order to detect a channel, the destination mobile station 4b (with a call number of 1234) waits for an incoming call to the self side by scanning continuously (cyclically) the carriers of the carrier numbers "5", "6", and "7" in the order of 5, 6, 7, 5, 6, 7 ... (refer to (1) in FIG. 3).

In the originating operation, the originating mobile station 4a starts retrieving a vacant channel among the carriers of the carrier numbers "5", "6", and "7" (refer to (2) in FIG. 3). When the destination mobile station 4b detects an incoming carrier to itself (refer to (3) in FIG. 3), the synchronous operation is performed to sound a ringing tone. Then, the operator on the destination side performs a response operation to start a telephone call.

When the destination mobile station 4b detects a radio wave interference during a direct communication with the mobile station 4a, it requests the mobile station 4a to switch the line to another channel. The channel switching control during communication is shown in FIG. 4.

When the originating mobile station 4a receives a channel switching request from the destination wireless handset 4b during communication, it scans cyclically the carrier numbers 5, 6, and 7 to start retrieving a channel to be switched among the carriers. Thus, the channel to be switched is selected among the carrier numbers 5, 6, 7 (refer to (1) in FIG. 4).

Figure 4:
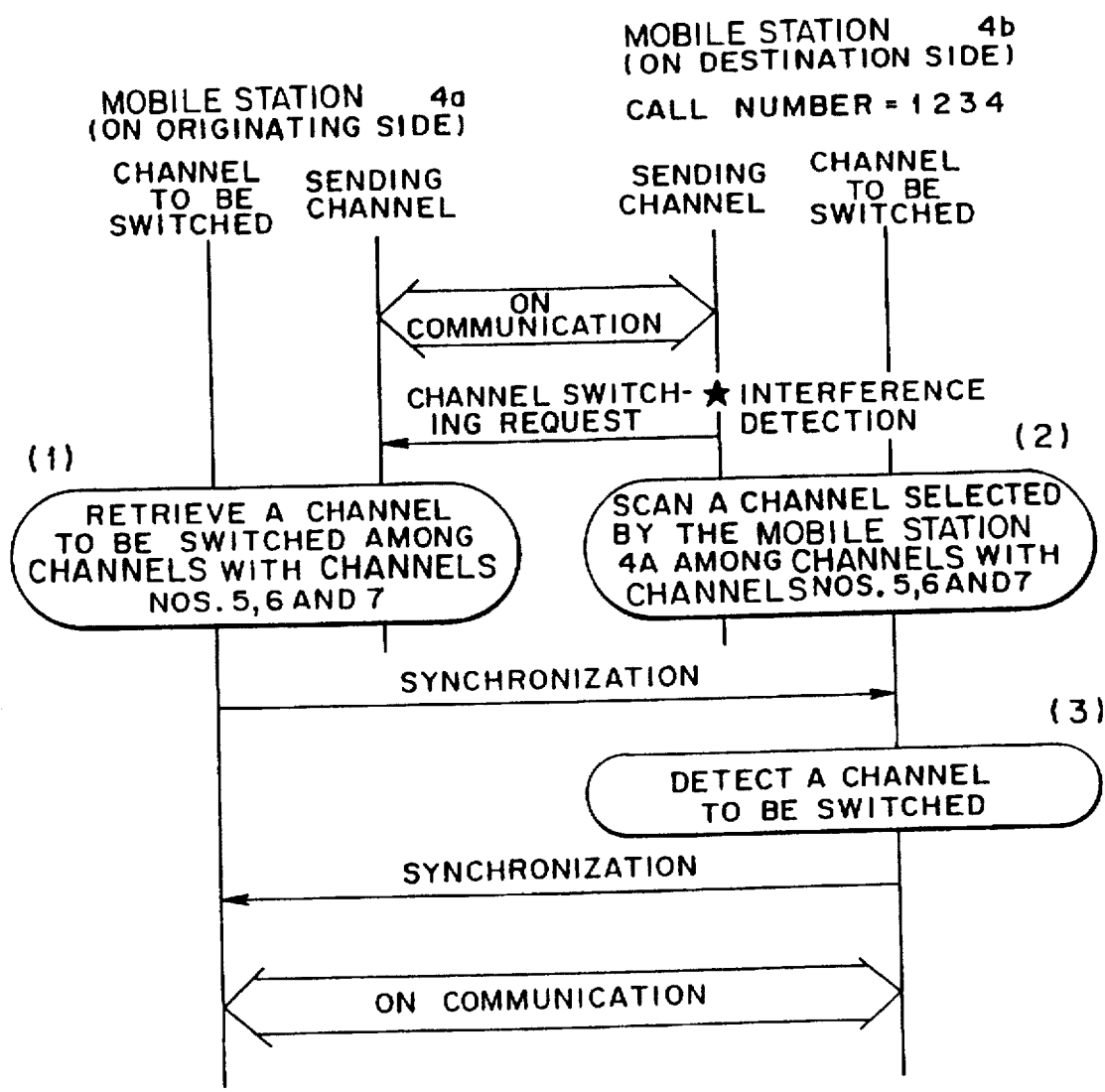
FIG. 4 is a diagram used for explaining a radio channel selecting method applicable for a mobile station to mobile station direct communication system according to the present invention.

Next, the destination mobile station 4b scans and detects a channel among the carriers of the carrier numbers 5, 6, and 7, selected by the originating mobile station 4a (refer to (2) in FIG. 4). Thereafter, a calling operation is performed via the selected channel.

The destination mobile station 4b scans continuously the selected carrier number till the incoming call detection or the switched radio channel retrieval is completed.

The case where the opposite mobile station has a call number, for example, 5678, different from that described above will be briefly explained below. In the case, as described above, the carrier numbers selected by the originating mobile station 4a are three values "9", "10", and "1" including an initial value and values taken at one interval, the initial value 9 being 1 plus the remainder obtained by dividing the call number by 10. Because the carrier number is 10, 1 follows 10. This rule is applicable in the following steps.

The destination detection time can be reduced by selecting a carrier based on inherent information regarding the destination mobile station 4b, thus taking effectively advantage of a limited channel.

In the incoming call retrieval operation of the destination mobile station 4b, when the carrier numbers "5", "6", and "7" are selected, the incoming call retrieval is performed in the order of 5, 6, 7, 5, 6, 7, . . . so that each carrier number is retrieved at a time ratio of 1:1:1, as shown in FIG. 7.

In the originating mobile station 4a and the destination mobile station 4b, the memory 19 has addresses arranged as shown in FIG. 9(a). The carrier number first retrieved is stored in the address F1 and the carrier number secondly retrieved is stored in the address F2. Similarly, carrier numbers are stored in addresses F3, F4, . . . , Fy, respectively.

Hence, when the carrier numbers 5, 6, and 7 are selected as carriers, the destination mobile station 4b, as shown in FIG. 9(b), stores the carrier number 5 to the address F1, the carrier number 6 to the address F2, and the carrier number 7 to the address F3.

The number of addresses scanned at one cycle retrieval is stored as a rotation number Y (here 3) into the address F0.

The destination detection of each carrier number is executed in accordance with the flow chart shown in FIG. 10.

In the flow chart, when the incoming call detection is started, the value y is set to 1 in the step S1. Next, the flow goes to the step S2 to retrieve Fy (here, F1). In the step S3, the presence or absence of calling to the self side is decided using the carrier number corresponding to the address F1.

When it is decided that there is a call to the self side in the step S3, the flow goes to the step S4 to perform and the incoming call process, whereby the scanning operation to detect the incoming call is completed. When it is decided that there is no call to the self side in the step S3, the value y is compared with the rotation value Y. If the value y is smaller than the rotation number Y, the flow goes to the step S6. If the value y is larger than the rotation number Y, the flow goes to the step S7. In this case, since y=1 and Y=3, the flow goes to the step S6 via the YES route.

The value 1 is added to the value y in the step S6. Then, the flow goes back to the step S2. When the flow goes from the step S5 to the step S7 via the NO route, the value y is reset to 1 in the step S7. Then the flow goes back to the step S2. This process according to the flow chart is repeated till an incoming call is detected.

The incoming call detection is repeatedly performed to the address F1, the address F2, the address F3, the address F1, the address F2, . . . to scan the carrier number corresponding to each address.

As shown in FIG. 9(b), the carrier numbers are scanned in the order of 5, 6, 7, 5, 6, 7, . . . , in accordance with the flow chart.

Next, explanation will be made as for a carrier selecting condition different from that described above, or the case of N=10, n=1, i=3, and j=4.

If the call number of the destination mobile station 4b is 1234, the carrier number candidates used at a channel switching operation during a calling, incoming call detection, and communication has four values including an initial value 5 and three values at three intervals, the initial value being 1 plus the remainder obtained by dividing the call number by 10. Since N=10, the carrier number as a candidate is 1 following 10. Hence, 5, 8, 1, and 4 are selected as a carrier number candidate, respectively.

Figure 5:
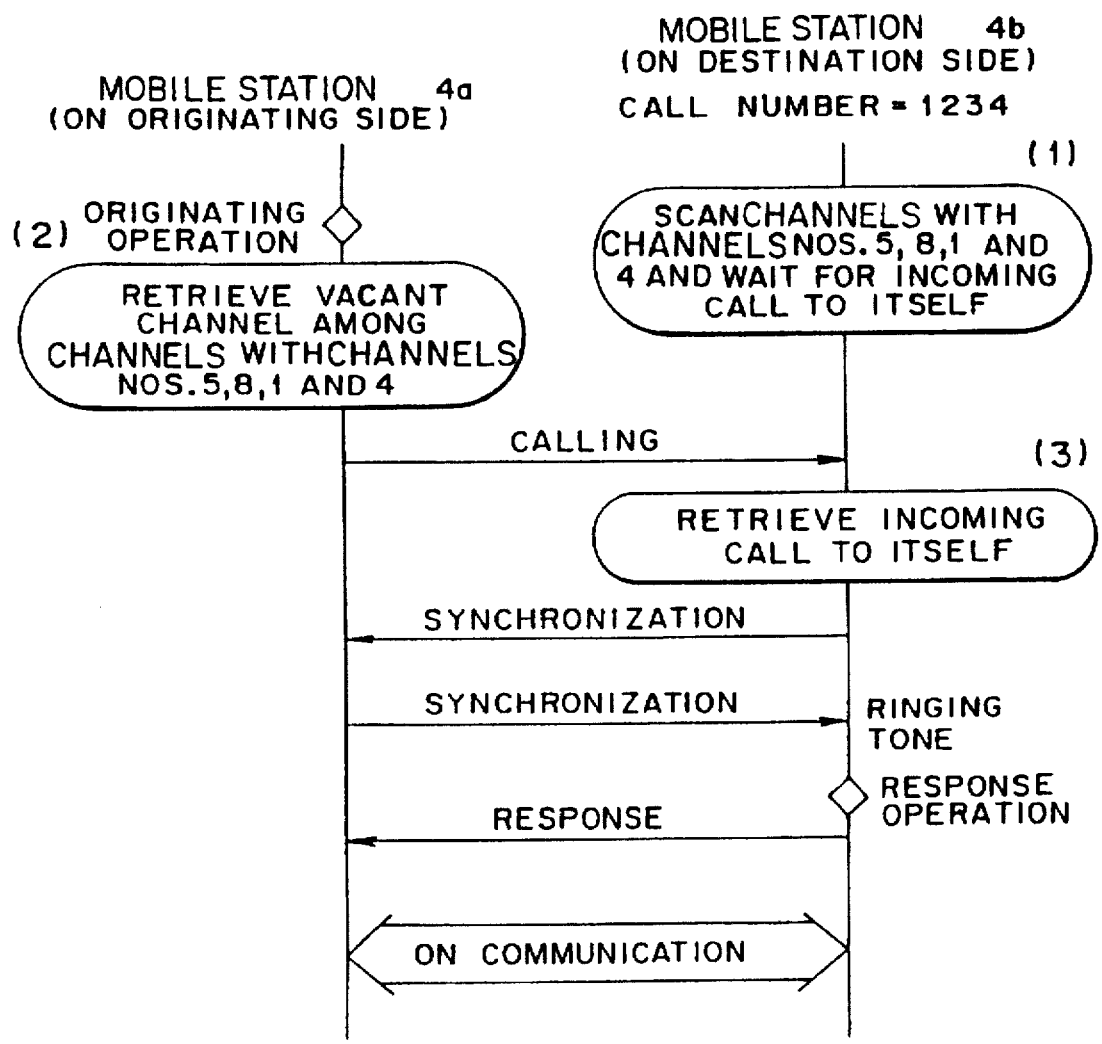
FIG. 5 is a diagram used for explaining a radio channel selecting method applicable for a mobile station to mobile station direct communication system according to the present invention.

The destination mobile station 4b (the call number=1234), as shown in FIG. 5, scans the carder number in the order of 5, 8, 1, 4, 5, 8, 1, 4, . . . to wait for an incoming call to the self side (refer to (1) in FIG. 5).

When the originating mobile station 4a performs an originating operation, it starts retrieving a vacant channel among the carriers corresponding to the carrier numbers 5, 8, 1, and 4 (refer to (2) in FIG. 5). The destination mobile station 4b performs an incoming call to the self side (refer to (3) in FIG. 5), thus synchronously sounding a ringing tone. Thus, a telephone call can be started at the destination side through a response operation.

Figure 6:
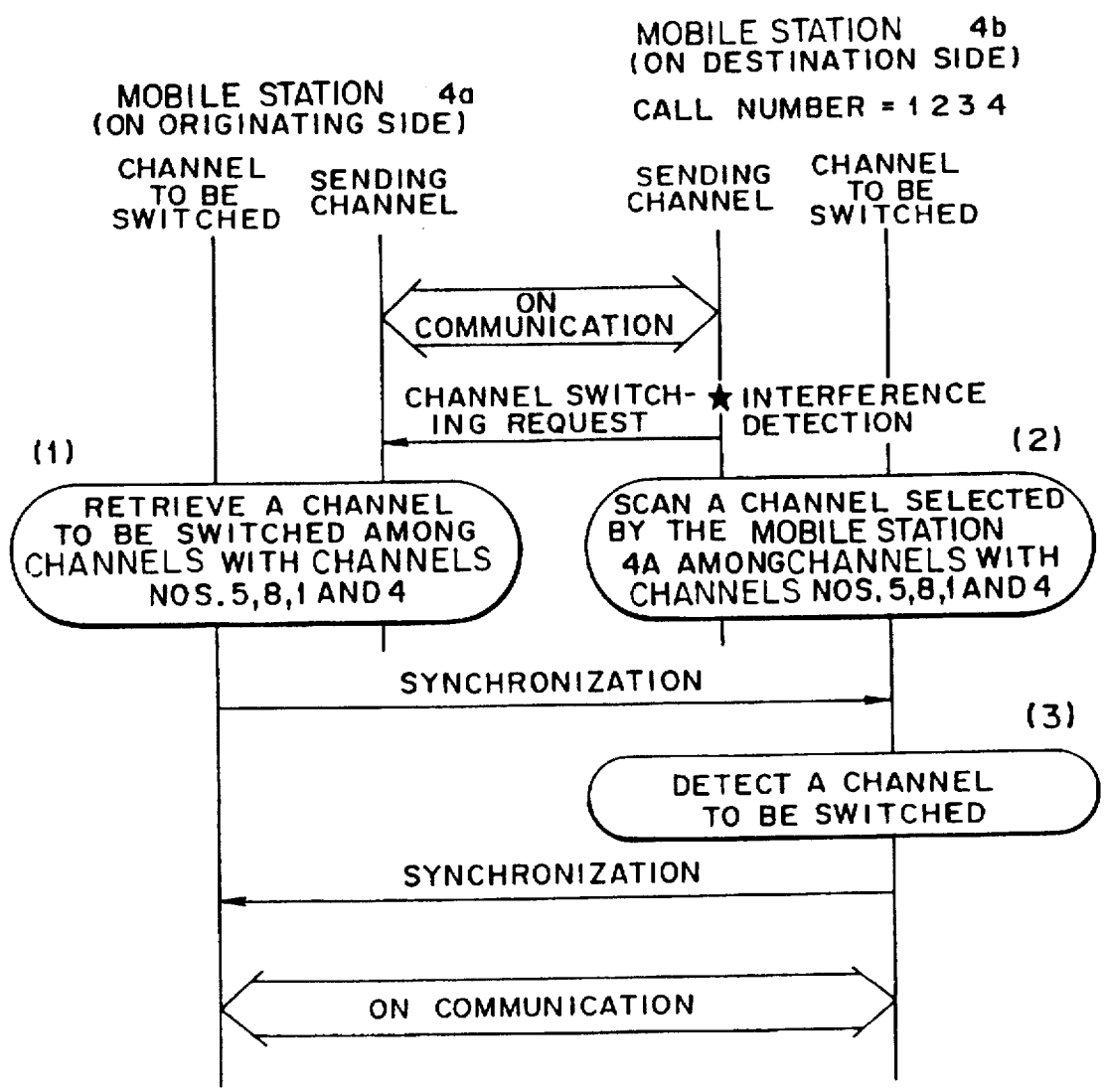
FIG. 6 is a diagram used for explaining a radio channel selecting method applicable for a mobile station to mobile station direct communication system according to the present invention.

As shown in FIG. 6, when the destination mobile station 4b detects a radio wave interference during a direct communication between the mobile stations, it requests the originating mobile station 4a to control a channel switching operation.

When the originating mobile station 4a receives a channel switching request from the destination mobile station 4b during communication, it scans cyclically the carrier numbers 5, 8, 1, 4 to start retrieving a channel to be selected among the carriers (refer to (1) in FIG. 6). The destination mobile station 4b scans a channel selected by the originating mobile station 4a among the carriers 5, 8, 1, 4 (refer to (2) in FIG. 6) and the destination mobile station 4b detects the selected channel (refer to (3) in FIG. 6), a telephone communication is performed via the selected channel.

The destination mobile station 4b can select a selected carrier number with a priority.

As for the carrier priority in the time chart shown in FIG. 7, each carrier number is scanned at a time ratio of 1:1:1. However, the destination mobile station 4b includes memory means for storing information regarding a carrier used in the past, and means for selecting a selectable carrier number with a priority based on the carrier information stored in the memory means. This feature allows a specific carrier number to be scanned with a priority. The memory means corresponds to the memory 19 and the priority taking means corresponds to the main control unit 17.

When the originating mobile station 4a sends a call number of 1234 to the destination mobile station 4b, it retrieves a vacant channel in the order of the carrier numbers 5, 6, and 7. For example, the retrieving process may be in the order of the carrier number 5 with the highest selection probability to be first retrieved, the carrier number 6 with higher selection probability in the second place, and the carrier number 7.

An incoming call to the self side can be detected faster by storing a carrier used in the past as carrier information into the memory means and adjusting the scanning frequency of carrier numbers 5, 6, and 7 at the time the destination mobile station 4b is in an incoming call waiting state. The example is shown with the time chart in FIG. 8.

As shown in FIG. 8, if the selected carrier numbers are 5, 6, and 7, the carrier selecting means in the destination mobile station 4b scans the carrier number 5 with a priority by deciding that the carrier number 5 has the highest selection probability. A channel, for example, is cyclically detected in the order of 5, 6, 5, and 7.

In this case, since channels 5, 6, and 7 are scanned at the time ratio of 2:1:1, respectively, the channel detection time can be reduced.

At this time, the address in the memory 19 corresponds to the rotation number 4, as shown in FIG. 9(c).

The procedure of detecting the incoming call of the carrier number in the destination mobile station 4b is the same as that explained with FIG. 10.

The originating mobile station 4a can partially accept the function of selecting a selected carrier number with a priority. In this case, since the originating mobile station 4a operates as the destination mobile station 4b, the duplicate explanation will be omitted here.

The destination mobile station 4b includes means for adjusting the retrieval frequency of a selectable carrier, based on the information regarding a carrier stored in the memory means, so that the retrieval frequency of a carrier can be adjusted in accordance with the use of carriers in the past.

Explanation will be made below as for how the carrier retrieval frequency is adjusted.

The memory means in the destination mobile station 4b stored the total sum M of the number $m_k$ (k=1, 2, ..., N) of times the carrier number K has been used in past and the number of times a carrier number has been selected by the originating mobile station 4a.

When the selected carrier numbers are 5, 6, and 7 (or k=5, 6, 7), the destination mobile station 4b scans the selected carriers at a ratio similar to m5: m6: m7 (m5+m6+m7=M). The ratio is compensated in accordance with the maximum time of the originating mobile station 4a and the scanning interval on the destination side.

In a concrete example, if M=1000, m5=502, m6=333, m7 =165, the maximum call time on the originating side=10 seconds, and the scanning interval on the destination side=1 second, the ratio is represented the ratio of m5: m6: m7≈3:2:1. The destination mobile station 4b retrieves cyclically the carrier numbers in the scanning order of 5, 6, 5, 7, 5, 6 represented as a block.

In this case, the address in the memory 19 is shown in FIG. 9(d) and the rotation number is 6.

The procedure by which the destination mobile station 4b detects the incoming call of a carrier number is similar to that shown in FIG. 10.

If M=1000, m5=508, m6=441, m7=51, the maximum call time on the originating side=10 seconds, and the scanning interval on the destination side=1 second, the ratio is represented the ratio of m5: m6: m7≈10:9:1. Therefore, the destination mobile station 4b scans the carrier number 7 once every 20 cycles.

In consideration of the maximum call time of the originating side and the scanning intervals of the destination side, when the originating mobile station 4a selects the carrier number 7, the destination mobile station 4b must scan it at least once every 10 seconds to detect an incoming call to the self side without errors. In this example, since the scanning interval on the destination side is 1 second, the scanning operation is repeated 10 times during the calling time of 10 seconds. This means that the carrier number 7 must be retrieved once every 10 scanning operations for the incoming call detection.

Hence, the time ratio of scanning each channel is compensated to 5:4:1. The carrier number is retrieved cyclically in the order of, for example, 5, 6, 5, 6, 5, 7, 5, 6, 5, 6.

When a channel to be selected for a mobile station is scanned at a channel switching operation during a direct communication between mobile stations, the retrieval frequency is adjusted as the example described above.

In the cordless telephone set 4, the originating mobile station handset 4a and the destination mobile station 4b include carrier selection changing means, respectively. The carrier selecting means can change the carrier selecting condition. The carrier selection changing means is mainly constituted of the memory 19, the ten-key and function-key board 16, and the external interface 18.

Usually, in manufacture and before shipping, a device manufacturer sets the initial value of the carrier selecting condition in the memory 19. After a user has purchased the digital cordless telephone set 4, the carrier selecting condition changing means allows him to set a carrier selecting condition.

The ROM 21 and the EEPROM 22 within the memory 19 can store various information regarding channel selecting conditions for the cordless telephone set 4. In the mobile station 4a and 4b, an information entry operation can be performed using the ten-key and function-key board 16. Moreover, the carrier selecting condition can be changed by rewriting the contents of the ROM 21 or EEPROM 22.

The entry operation should not be limited to the inputting from the ten-key and function-key board 16. Such an entry operation can be made by inputting and outputting information from the external interface (terminal) 18 at which a personal computer is connected.

The FIG. 11 shows an algorithm for the main control unit 17 in the case where the destination mobile station 4b is set to a changed initial value.

As for this algorithm, the command of "Activate Write Request" is first received in the step SA1 by way of the ten-key and function-key board 16 or the personal computer connected to the external interface 18, the flow goes to the step SA2 to wait for receiving "Write Request Information".

In the step SA3, when information regarding "Write Request" is actually received by way of the ten-key and function-key board 16 or the personal computer connected to the external interface 18, the information is analyzed in the step SA4.

When writing the rotation number Y, for example, is required, the request value is newly set to Y in the step SA5.

When writing a carrier number to the address Fy (where y =1, 2, ..., Y) in the memory 19 is requested, the request value is set to Fy in the step SA6.

After the steps SA5 and SA6, the flow goes back to the step SA3 to repeat the same procedure. When it is decided that the writing operation has been completed in the step SA4, the algorithm is terminated.

Thus, the destination mobile station 4b can change the carrier selection condition.

Next, in the originating mobile station 4a, the carrier selection condition is changed according to the algorithm shown in FIG. 12.

Like the algorithm for the destination mobile station 4b, when the command of "Activate Write Request" is received under the algorithm by way of the ten-key and function-key board 16 or the personal computer connected to the external interface 18 each acting as operating means in the step SB1, the flow goes to the step SB2 to wait for receiving "Write Request information".

In the step SB3, when information regarding "Write Request" is actually received by way of the ten-key and function-key board 16 or the personal computer connected to the external interface 18, the information is analyzed in the step SB4.

Then, in order to select the carrier number based on the input information, the operational parameters L, n, i, j are rewritten.

That is, when writing the natural number L is requested in the step SB4, the flow goes to the step SB5 so that the request value is set to L to change the natural number L. When writing the natural number n is requested, the flow goes to the step SB6 so that the request value is set to n to change the natural number n.

Similarly, the carrier selecting condition is changed by setting the natural number i in the step SB7 and the natural number j in the step SB8.

After the steps SB5 to SB8, the flow goes back to the step SB3. Then the steps SB3 to SB8 are repeated till the writing operation is completed in the step SB4.

Thus, as for the originating mobile station 4a, a user can change arbitrarily the carrier selecting condition.

The algorithm shown in FIG. 12 should not be limited only to the originating mobile station 4a. The destination mobile station 4b may be made to change the carrier selecting condition.

Furthermore, like the carrier selection condition changing operation described above, the digital cordless telephone set 4 according to the present invention can read or erase the record on use frequency of the old carrier number.

FIG. 13 shows an algorithm for reading or erasing the record on use frequency of the old carrier number. This algorithm will be explained below.

In the step SC1, when the command of "Activate Use-Frequency Request" is received by way of the ten-key and function-key board 16 or the personal computer connected to the external interface 18, the flow goes to the step SC2 to wait for receiving "Use-Frequency Request Information".

In the step SC3, when information regarding "Use-Frequency Request Information" is actually received by way of the ten-key and function-key board 16 or the personal computer connected to the external interface 18, the requested information is analyzed in the step SC4.

For example, when there is a request for reading the use-frequency of the carrier number n, the use-frequency of the carrier number n is transmitted in the step SC5. Then, the use-frequency is displayed on a display such as an LCD 14 of the mobile station 4, or inputted to the personal computer via the external interface 18.

When there is a clearing request, the frequency in use of each carrier number is reset to zero in the step SC6.

After the step SC5 or SC6, the flow goes back to the step SC3. Then, the steps SC3 to SC6 are repeated. When it is decided that reading and clearing the use-frequency is completed in the step SC4, the algorithm is terminated.

For convenience, the digital cordless telephone set 4 separated into an originating mobile station 4a and a destination mobile station 4b has been explained. Actually, a single the digital cordless telephone set functions as the originating mobile station 4a and the destination wireless handset 4b.

According to the present invention, the radio channel selecting method in a mobile station to mobile station direct communication system as well as the originating mobile station and the destination mobile station used in the mobile station to mobile station direct communication system are applicable as the embodiments described above. Hence, in order to perform a direct communication between mobile stations using the digital cordless telephone set 4, the originating mobile station 4a selects a channel to be used based on information regarding the call number of the destination mobile station 4b while the destination mobile station 4b selects a channel based on information regarding the call number of the self (destination) mobile station 4b, whereby the channels are retrieved. Hence, since it is avoided that a selecting operation concentrates on only a channel with a specific number, the frequency in use of each channel can be averaged.

Furthermore, since it is not needed to retrieve all channels for direct communications between mobile station, the incoming call detecting time can be shortened.

In the originating mobile station 4a and the destination mobile station 4b, the carrier selecting means can scan a carrier used in the past with a priority, thus reducing the incoming call detection time.

The carrier selecting means in the destination mobile station 4b includes the carrier retrieval frequency adjusting means that can reduce the incoming call detecting time.

Since the carrier selection changing means is arranged in each of the originating mobile station 4a and the destination mobile station 4b, a user can change a carrier selecting condition.

The carrier selection changing means can easily change the carrier selecting condition in accordance with information input via the operating means added to the originating mobile station.

What is claimed is:

1. A radio channel selecting method for a mobile station to mobile station direct communications system in a wireless telephone system; said wireless telephone system including plural mobile stations and a base station accommodating said plural mobile stations; plural mobile station to mobile station direct communication channels which are provided as mobile station to mobile station direct communication channels being used when said plural mobile stations are mutually communicating without involving a base station, said method comprising the step of:

selecting a channel which is used as a radio channel to be switched to mobile station direct communication channels, during a call or communication among said plural mobile station, by means of an originating mobile station, based on information regarding a destination mobile station when a direct communication is intended between mobile stations without involving a base station.

2. The radio channel selecting method for a mobile station to mobile station direct communications system according to claim 1, wherein said originating mobile station selects said channel based on information regarding a call number of said destination mobile station, said channel being used as a radio channel during a call or communication to be switched.

3. The radio channel selecting method for a mobile station to mobile station direct communications system according to claim 2, wherein said originating mobile station selects a channel which is used as a radio channel during a call or communication to be switched, said channel being one selected from an initial value among j (natural number) radio channels spaced apart by an interval i (natural number), said initial value being n (natural number) plus a remainder obtained by dividing the call number of said destination mobile station by L(natural number).

4. The radio channel selecting method for a mobile station to mobile station direct communications system according to claim 2, wherein said originating mobile station selects a selectable channel with a priority, said channel being used as a radio channel during a call or communication to be switched.

5. The radio channel selecting method for a mobile station to mobile station direct communications system according to claim 1, wherein said originating mobile station selects a selectable channel with a priority, said channel being used as a radio channel during a call or communication to be switched.

6. A radio channel selecting method for a mobile station to mobile station direct communications system in a wireless telephone system; said wireless telephone system including plural mobile stations and a base station accommodating said plural mobile stations; plural mobile station to mobile station direct communication channels which are provided as mobile station to mobile station direct communication channels being used when said plural mobile stations are mutually communicating without involving a base station, said method comprising the steps of:

selecting a channel which is used as a radio channel to be switched to base station communication channels by means of an originating mobile station, during an incoming call or communication among said plural mobile station, based on information regarding a destination mobile station when a direct communication is intended between mobile stations without involving a base station; and selecting a channel which is retrieved as a radio channel to be switched to mobile station direct communication channels, by means of a destination mobile station, during an incoming call or communication among said plural mobile station based on information regarding said destination mobile station itself, when said direct communication is intended.

7. The radio channel selecting method for a mobile station to mobile station direct communications system according to claim 6, wherein said originating mobile station selects a channel based on information regarding the call number of said destination mobile station, said channel being used as a radio channel to be switched during a call or communication; and wherein said destination mobile station selects a channel based on information regarding the call number of said destination mobile station itself when a radio channel to be switched is retrieved during an incoming call or communication.

8. The radio channel selecting method for a mobile station to mobile station direct communications system according to claim 7, wherein said originating mobile station selects a channel which is used as a radio channel during a call or communication to be switched, said channel being one selected from an initial value i among j (natural number) radio channels spaced apart by an internal i (natural number), said initial value being n (natural number) plus a remainder obtained by dividing the call number of said destination mobile station by L (natural number) and wherein said destination mobile station selects a channel when a radio channel to be switched is retrieved during an incoming call or communication, said channel being one selected from an initial value among j (natural number) radio channel spaced apart by an interval i (natural number), said initial value being n (natural number) plus a remainder obtained by dividing the call number of said destination mobile station by L (natural number).

9. The radio channel selecting method for a mobile station to mobile station direct communications system according to claim 7, wherein said destination mobile station selects a selectable channel with a priority when a radio channel to be switched is retrieved during an incoming call or communication.

10. The radio channel selecting method for a mobile station to mobile station direct communications system according to claim 9, wherein said destination mobile station selects a selectable channel with a priority based on a channel used in the past when a radio channel to be switched is retrieved during an incoming call or communication.

11. The radio channel selecting method for a mobile station to mobile station direct communications system according to claim 10, wherein said destination mobile station adjusts the retrieval frequency to a selectable channel based on a channel used in the past when a radio channel to be switched is retrieved during an incoming call or communication.

12. The radio channel selecting method for a mobile station to mobile station direct communications system according to claim 6, wherein said destination mobile station selects a selectable channel with a priority when a radio channel to be switched is retrieved during an incoming call or communication.

13. The radio channel selecting method for a mobile station to mobile station direct communications system according to claim 12, wherein said destination mobile station selects a selectable channel with a priority based on a channel used in the past when a radio channel to be switched is retrieved during an incoming call or communication.

14. The radio channel selecting method for a mobile station to mobile station direct communications system according to claim 13, wherein said destination mobile station adjusts the retrieval frequency to a selectable channel based on a channel used in the past when a radio channel to be switched is retrieved during an incoming call or communication.

15. An originating mobile station for a mobile station to mobile station direct communications system, said originating mobile station being used in a wireless telephone system including plural mobile stations and a base station accommodating said plural mobile stations; plural mobile station to mobile station direct communication channels which are provided as mobile station to mobile station direct communication channels being used when said plural mobile stations are mutually communicating without involving base station; said originating mobile station among mobile stations which can establish mobile station to mobile station direct communications without involving a base station, comprising:

channel selecting means for selecting a channel used as a radio channel to be switched to mobile station direct communication channels, during a call or communication among said plural mobile station, based on information regarding a destination mobile station.

16. The originating mobile station for a mobile station to mobile station direct communications system according to claim 15, wherein said channel selecting means selects said channel based on information regarding a call number of said destination mobile station.

17. The originating mobile station for a mobile station to mobile station direct communications system according to claim 16, wherein said channel selecting means comprises initial value setting means for setting as an initial value a value of n (natural number) plus a remainder obtained by dividing the call number of said destination mobile station by L (natural number); and channel selecting means for selecting a carrier to be used among j (natural number) radio channels spaced apart by an interval i (natural number), based on said initial value set by means of said initial value setting means.

18. The originating mobile station for a mobile station to mobile station direct communications system according to claim 17, further comprising channel selecting changing means that changes a channel selection condition for said channel selecting means.

19. The originating mobile station for a mobile station to mobile station direct communications system according to claim 18, wherein said channel selection changing means changes a channel selection condition in accordance with information inputted via operating means added to said originating mobile station.

20. The originating mobile station for a mobile station to mobile station direct communications system according to claim 16, wherein said channel selecting means selects a selectable channel with a priority.

21. The originating mobile station for a mobile station to mobile station direct communications system according to claim 20, further comprising a channel selection changing means that changes a channel selection condition for said channel selecting means.

22. The originating mobile station for a mobile station to mobile station direct communications system according to claim 21, wherein said channel selection changing means changes a channel selection condition in accordance with information inputted via operating means added to said originating mobile station.

23. The originating mobile station for a mobile station to mobile station direct communications system according to claim 16, further comprising a channel selection changing means that changes a channel selection condition for said selecting means.

24. The originating mobile station for a mobile station to mobile station direct communications system according to claim 23, wherein said channel selection changing means changes a channel selection condition in accordance with information inputted via operating means added to said originating mobile station.

25. The originating mobile station for a mobile station to mobile station direct communications system according to claim 15, wherein said channel selecting means selects a selectable channel with a priority.

26. The originating mobile station for a mobile station to mobile station direct communications system according to claim 25, further comprising a channel selection changing means that changes a channel selection condition for said channel selecting means.

27. The originating mobile station for a mobile station to mobile station direct communications system according to claim 26, wherein said channel selection changing means changes a channel selection condition in accordance with information inputted via operating means added to said originating mobile station.

28. The originating mobile station for a mobile station to mobile station direct communications system according to claim 15, further comprising a channel selection changing means that changes a channel selection condition for said channel selecting means.

29. The originating mobile station for a mobile station to mobile station direct communications system according to claim 28, wherein said channel selection changing means changes a channel selection condition in accordance with information inputted via operating means added to said originating mobile station.

30. A destination mobile station for a mobile station to mobile station direct communications system, said destination mobile station being used in a wireless handset telephone system including plural mobile stations and a base station accommodating said plural mobile stations; plural mobile station to mobile station direct communication channels which are provided as mobile station to mobile station direct communication channels being used when said plural mobile stations are mutually communicating without involving a base station said destination mobile station among mobile stations which can establish mobile station to mobile station direct communications without involving a base station comprising:

channel selecting means for selecting a channel at the time of retrieving a radio channel to be switched to mobile station direct communication channels, during an incoming call or communication among said plural mobile station, based on information regarding said destination mobile station itself.

31. A destination mobile station for a mobile station to mobile station communications system according to claim 30, said channel selecting means selects a channel based on information regarding a self call number.

32. The destination mobile station for a mobile station to mobile station direct communications system according to claim 31, wherein said channel selecting means comprises initial value setting means for setting as an initial value a value of n (natural number) plus a remainder obtained by dividing the call number of said destination mobile station by L (natural number); and channel selecting means for selecting a channel to be used among j (natural number) radio channels spaced apart by an interval i (natural number), based on said initial value set by means of said initial value setting means.

33. The destination mobile station for a mobile station to mobile station direct communications system according to claim 32, further comprising a channel selection changing means that changes a channel selecting condition for said channel selecting means.

34. The destination mobile station for a mobile station to mobile station direct communications system according to claim 33, wherein said channel selection changing means changes a channel selection condition in accordance with information inputted via operating means added to said originating mobile station.

35. The destination mobile station for a mobile station to mobile station direct communications system according to claim 31, wherein said channel selecting means selects a selectable channel with a priority.

36. The destination mobile station for a mobile station to mobile station direct communications system according to claim 35, wherein said channel selecting means comprises memory means for storing information regarding a channel used in the past; and selecting means for selecting a selectable channel with a priority based on the channel information used in the past stored in said memory means.

37. The destination mobile station for a mobile station to mobile station direct communications system according to claim 36, wherein said channel selecting means comprises memory means for storing information regarding a channel used in the past; and means for adjusting a selectable channel with a retrieval frequency based on the channel information used in the past stored in said memory means.

38. The destination mobile station for a mobile station to mobile station direct communications system according to claim 37, further comprising channel selection changing means that changes a channel selection condition for said channel selecting means.

39. The destination mobile station for a mobile station to mobile station direct communications system according to claim 38, wherein said channel selection changing means changes a channel selection condition in accordance with information inputted via an operating means added to said originating mobile station.

40. The destination mobile station for a mobile station to mobile station direct communications system according to claim 36, further comprising a channel selection changing means that changes a channel selection condition for said channel selecting means.

41. The destination mobile station for a mobile station to mobile station direct communications system according to claim 40, wherein said channel selection changing means changes a channel selection condition in accordance with information inputted via an operating means added to said originating mobiles station.

42. The destination mobile station for a mobile station to mobile station direct communications system according to claim 35, further comprising channel selection changing means that changes a channel selection condition for said channel selecting means.

43. The destination mobile station for a mobile station to mobile station direct communications system according to claim 42, wherein said channel selection changing means changes a channel selection condition in accordance with information inputted via operating means added to said originating mobile station.

44. The destination mobile station for a mobile station to mobile station direct communications system according to claim 31, further comprising channel selection changing means that changes a channel selection condition for said channel selecting means.

45. The destination mobile station for a mobile station to mobile station direct communications system according to claim 68, wherein said channel selection changing means changes channel selection condition in accordance with information inputted via operating means added to said originating mobile station.

46. The destination mobile station for a mobile station to mobile station direct communications system according to claim 30, wherein said channel selecting means selects a selectable channel with a priority.

47. The destination mobile station for a mobile station to mobile station direct communications system according to claim 46, wherein said channel selecting means comprises memory means for storing information regarding a channel used in the past; and selecting means for selecting a selectable channel with a priority based on the channel information used in the past in said memory means.

48. The destination mobile station for a mobile station to mobile station direct communications system according to claim 47, wherein said channel selecting means comprises memory means for storing information regarding a channel used in the past; and means for adjusting a selectable channel with a retrieval frequency of said selectable channel on the channel information used in the past stored in said memory means.

49. The destination mobile station for a mobile station to mobile station direct communications system according to claim 48, further comprising channel selection changing means that changes a channel selection condition for said channel selecting means.

50. The destination mobile station for a mobile station to mobile station direct communications system according to claim 49, wherein said channel selection changing means changes a channel selection condition in accordance with information inputted via operating means added to said originating mobile station.

51. The destination mobile station for a mobile station to mobile station direct communications system according to claim 47, further comprising channel selection changing means that changes the channel selection condition of said channel selecting means.

52. The destination mobile station for a mobile station to mobile station direct communications system according to claim 51, wherein said channel selection changing means changes a channel selection condition in accordance with information inputted via operating means added to said originating mobile station.

53. The destination mobile station for a mobile station to mobile station direct communications system according to claim 46, further comprising channel selection changing means that changes the channel selection condition of said channel selecting means.

54. The destination mobile station for a mobile station to mobile station direct communications system according to claim 53, wherein said channel selection changing means changes a channel selection condition in accordance with information inputted via operating means added to said originating mobile station.

55. The destination mobile station for a mobile station to mobile station direct communications system according to claim 54, further comprising channel selection changing means that changes the channel selection condition of said channel selecting means.

56. The destination mobile station for a mobile station to mobile station direct communications system according to claim 55, wherein said channel selection changing means changes a channel selection condition in accordance with information inputted via operating means added to said originating mobile station.

57. A radio channel selecting method for a mobile station to mobile station direct communications system in a wireless telephone system; said wireless telephone system including plural mobile stations and a base station accommodating said plural mobile stations; a mobile station to base station communication channel being used when a mobile station among said plural mobile stations is communicating with said base station; plural mobile station to mobile station direct communication channels being used when said plural mobile stations are mutually communicating without involving a base station, said method comprising the step of:

selecting a channel which is used as a radio channel to be switched to mobile station direct communication channels, during a call or communication among said plural mobile station, by means of an originating mobile station, based on information regarding a destination mobile station when a direct communication is intended between mobile stations without involving a base station, wherein said originating mobile station selects said channel based on information regarding a call number of said destination station, said channel being used as a radio channel during a call or said direct communication between mobile stations, and wherein said originating mobile station selects a channel which is used as a radio channel during a call or said direct communication between mobile stations, said channel being one selected from an initial value among j (natural number) radio channels spaced apart by an interval i (natural number), said initial value being n (natural number) plus a remainder obtained by dividing the call number of said destination mobile station by L (natural number).

58. A radio channel selecting method for a mobile station to mobile station direct communications system in a wireless telephone system; said wireless telephone system including plural mobile stations and a base station accommodating said plural mobile stations; a mobile station to base station communication channel being used when a mobile station among said plural mobile stations is communicating with said base station; plural mobile station to mobile station direct communication channels set differently from said mobile station to base station being used when said plural mobile stations are mutually communicating without involving a base station said method comprising the steps of:

selecting a channel which is used as a radio channel to be switched to base station communication channels, during an incoming call or communication among said plural mobile station, by means of an originating mobile station based on information regarding a destination mobile station when a direct communication is intended between mobile stations without involving a base station; and selecting a channel which is retrieved as a radio channel to be switched to mobile station direct communication channels, during an incoming call or communication among said plural mobile station, by means of a destination mobile station based on information regarding said destination mobile station itself, when said direct communication is intended, wherein said originating mobile station selects a channel based on information regarding the call number of said destination mobile station, said channel being used as a radio channel during a call or said direct communication between mobile stations; and wherein said destination mobile station selects a channel based on information regarding the call number of said destination mobile station itself when a radio channel to be switched is retrieved during an incoming call or communication, and wherein said originating mobile station selects a channel which is used as a radio channel during a call or said direct communication between mobile stations, said channel being one selected from an initial value among j (natural number) radio channels spaced apart by an interval i (natural number), said initial value being n (natural number) plus a remainder obtained by dividing the call number of said destination mobile station by L (natural number); and wherein said destination mobile station selects a channel when a radio channel to be switched is retrieved during an incoming call or communication, said channel being one selected from an initial value among j (natural number) radio channels spaced apart by an interval i (natural number), said initial value being n (natural number) plus a remainder obtained by dividing the call number of said destination mobile station by L (natural number).

59. An originating mobile station for a mobile station to mobile station direct communications system, said originating mobile station being used in a wireless telephone system including plural mobile stations and a base station accommodating said plural mobile stations; a mobile station to base station communication channel being used when a mobile station among said plural mobile stations is communicating with said base station; plural mobile station to mobile station direct communication channels being used when said plural mobile stations are mutually communicating without involving a base station; said originating mobile station among mobile stations which can establish mobile station to mobile station direct communications without involving a base station, comprising:

channel selecting means for selecting a channel used as a radio channel to be switched to mobile station direct communication channels, during an incoming call or communication among said plural mobile station, based on information regarding a destination mobile station, wherein said channel selecting means selects said channel based on information regarding a call number of said destination mobile station, and wherein said channel selecting means comprises initial value setting means for setting as an initial value a value of n (natural number) plus a remainder obtained by dividing the call number of said destination mobile station by L (natural number); and channel selecting means for selecting a carrier to be used among j (natural number) radio channels spaced apart by an interval i (natural number), based on said initial value set by means of said initial value setting means.

60. The originating mobile station for a mobile station to mobile station direct communications system according to claim 59, further comprising channel selecting changing means that changes a channel selection condition for said channel selecting means.

61. The originating mobile station for a mobile station to mobile station direct communications system according to claim 60, wherein said channel selection changing means changes a channel selection condition in accordance with information inputted via operating means added to said originating mobile station.

62. A destination mobile station for a mobile station to mobile station direct communications system, said destination mobile station being used in a wireless handset telephone system including plural mobile stations and a base station accommodating said plural mobile stations; a mobile station to base station communication channel being used when a mobile station among said plural mobile stations is communicated with said base station; plural mobile station to mobile station direct communication channels being used when said plural mobile stations are mutually communicating without involving a base station said destination mobile station mobile stations among mobile stations which can establish mobile station to mobile station direct communications without involving a base station comprising:

channel selecting means for selecting a channel at the time of retrieving a radio channel to be switched to mobile station direct communication channels, during an incoming call or communication among said plural mobile station, based on information regarding said destination mobile station itself, wherein said channel selecting means selects a channel based on information regarding a self call number, and wherein said channel selecting means comprises initial value setting means for setting as an initial value a value of n (natural number) plus a remainder obtained by dividing the call number of said destination mobile station by L (natural number); and channel selecting means for selecting a channel to be used among j (natural number) radio channels spaced apart by an interval i (natural number), based on said initial value set by means of said initial value setting means.

63. The destination mobile station for a mobile station to mobile station direct communications system according to claim 62, further comprising channel selection changing means that changes a channel selecting condition for said channel selecting means.

64. The destination mobile station for a mobile station to mobile station direct communications system according to claim 63, wherein said channel selection changing means changes a channel selection condition in accordance with information inputted via operating means added to said originating mobile station.

* * * * *